United States Patent
Ueno et al.

(10) Patent No.: US 12,410,264 B2
(45) Date of Patent: Sep. 9, 2025

(54) CONJUGATED DIENE GRAFT POLYMER AND METHOD FOR PRODUCING THE SAME

(71) Applicant: KURARAY CO., LTD., Kurashiki (JP)

(72) Inventors: Yoshikazu Ueno, Kamisu (JP); Hiroshi Kanbara, Kamisu (JP); Atsushi Inatomi, Tsukuba (JP); Junya Takai, Tsukuba (JP); Zhaoming Ma, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 710 days.

(21) Appl. No.: 17/761,384

(22) PCT Filed: Sep. 18, 2020

(86) PCT No.: PCT/JP2020/035408
§ 371 (c)(1),
(2) Date: Mar. 17, 2022

(87) PCT Pub. No.: WO2021/054428
PCT Pub. Date: Mar. 25, 2021

(65) Prior Publication Data
US 2022/0289872 A1 Sep. 15, 2022

(30) Foreign Application Priority Data
Sep. 20, 2019 (JP) .................. 2019-172169

(51) Int. Cl.
*C08C 19/25* (2006.01)
*C08C 19/00* (2006.01)
*C08C 19/26* (2006.01)
*C08L 15/00* (2006.01)

(52) U.S. Cl.
CPC .............. *C08C 19/25* (2013.01); *C08C 19/00* (2013.01); *C08C 19/26* (2013.01); *C08L 15/00* (2013.01)

(58) Field of Classification Search
CPC ........ C08C 19/25; C08C 19/26; C08F 279/02
See application file for complete search history.

(56) References Cited

U.S. PATENT DOCUMENTS

| | | | |
|---|---|---|---|
| 4,853,436 A | 8/1989 | Ohata et al. | |
| 4,864,003 A | 9/1989 | Fujimoto et al. | |
| 5,550,194 A * | 8/1996 | Hoxmeier | C08G 81/021 525/271 |
| 6,930,146 B1 * | 8/2005 | Okada | C08L 23/06 525/227 |
| 11,034,821 B2 | 6/2021 | Maeda et al. | |
| 11,207,918 B2 | 12/2021 | Kyo et al. | |
| 2006/0089445 A1 | 4/2006 | Gandon-Pain | |
| 2009/0292044 A1 | 11/2009 | Kawazura et al. | |
| 2015/0299367 A1 | 10/2015 | Matmour et al. | |
| 2019/0184747 A1 | 6/2019 | Kyo et al. | |
| 2019/0218376 A1 | 7/2019 | Maeda et al. | |

FOREIGN PATENT DOCUMENTS

| | | |
|---|---|---|
| EP | 0 279 463 A2 | 8/1988 |
| EP | 2 607 101 A1 | 6/2013 |
| EP | 3 296 324 A1 | 3/2018 |
| GB | 2 301 593 A | 12/1996 |
| JP | 63-205310 A | 8/1988 |
| JP | 4-25511 A | 1/1992 |
| JP | 2003-252927 A | 9/2003 |
| WO | WO 96/23824 A1 | 8/1996 |
| WO | WO 2008/004686 A1 | 1/2008 |
| WO | WO 2018/034195 A1 | 2/2018 |
| WO | WO 2018/043700 A1 | 3/2018 |

OTHER PUBLICATIONS

Hempenius, Macromolecules, 1997, 30, 5602-5605 (Year: 1997).*
Schapman, Polymer vol. 39, No. 20, pp. 4955-4962, 1998 (Year: 1998).*
Cameron, Makromol. Chem. Rapid Commun. 2, 287-291 (1981) (Year: 1981).*
International Search Report and Written Opinion issued Dec. 8, 2020 in PCT/JP2020/035408 filed Sep. 18, 2020, 5 pages.
Mark A. Hempenius, et al., "Arborescent Graft Polybutadienes," Macromolecules, vol. 30, No. 19, 1997, pp. 5602-5605.
Extended European Search Report issued on Sep. 7, 2023 in European Patent Application No. 20866221.3, 6 pages.

* cited by examiner

*Primary Examiner* — Robert C Boyle
(74) *Attorney, Agent, or Firm* — Oblon, McClelland, Maier & Neustadt, L.L.P.

(57) ABSTRACT

A conjugated diene graft polymer having high transparency, heat resistance and weather resistance, and a method for producing the conjugated diene graft polymer. A method for producing a conjugated diene graft polymer in which a side chain (b) including a polymer including at least one monomer unit selected from a conjugated diene unit and an aromatic vinyl compound unit is bonded to a main chain (a) including a polymer including a conjugated diene unit, via a hetero atom Z serving as a branching point and having a valence of not less than 3, the method including reacting a specific active end polymer and a specific functional group-modified conjugated diene polymer having a functional group in a side chain to thereby produce a conjugated diene graft polymer; and recovering the conjugated diene graft polymer obtained.

20 Claims, No Drawings

CONJUGATED DIENE GRAFT POLYMER AND METHOD FOR PRODUCING THE SAME

CROSS-REFERENCE TO RELATED APPLICATIONS

The present application is the national stage of international application PCT/JP2020/035408, filed on Sep. 18, 2020, and claims the benefit of the filing date of Japanese Appl. No. 2019-172169, filed on Sep. 20, 2019, the content of each of which is incorporated by reference.

TECHNICAL FIELD

The present invention relates to conjugated diene graft polymers excellent in transparency, heat stability and weather resistance, and methods for producing the same.

BACKGROUND ART

Branched polymers have been conventionally known to be higher in fluidity and more excellent in balance between processability and mechanical properties than linear polymers having the same molecular weights. For example, there is known a method for forming a conjugated diene graft polymer by a reaction of a polybutadiene where a silyl chloride group is grafted by hydrosilylation, with a living polymer having an active end of living anionic polymerization (see Non Patent Literature 1).

CITATION LIST

Patent Literature

Patent Literature 1: JP-A-2003-252927

Non Patent Literature

Non Patent Literature 1: Macromolecules, 1997, 30, 5602

SUMMARY OF INVENTION

Technical Problem

However, the conjugated diene graft polymer described in Non Patent Literature 1 contains a halide as a by-product in the polymer. The halide is demanded to be reduced in content thereof in the polymer in terms of environmental issue because of, for example, causing the occurrence of a harmful product when combusted (see Patent Literature 1). The conjugated diene graft polymer described in Non Patent Literature 1, high in content of the halide, has also been found to be problematic in terms of transparency, heat resistance and weather resistance. The Non Patent Literature does not study any solution for reducing the content of the halide in the polymer.

The present invention has been made in light of the circumstances discussed above, and an object thereof is to provide a conjugated diene graft polymer having high transparency, heat resistance and weather resistance, and a method for producing the conjugated diene graft polymer.

Solution to Problem

After extensive studies, the present inventors have found that a conjugated diene graft polymer produced by a production method including a step of reacting a specific active end polymer and a functional group-modified conjugated diene polymer having, as a branched chain, a moiety containing a specific functional group has high transparency, heat resistance and weather resistance. The present invention has been completed based on these findings.

The present invention provides the following [1] to [11].

[1] A method for producing a conjugated diene graft polymer in which a side chain (b) comprising a polymer comprising at least one monomer unit selected from the group consisting of a conjugated diene unit and an aromatic vinyl compound unit is bonded to a main chain (a) comprising a polymer comprising a conjugated diene unit, via a hetero atom Z serving as a branching point and having a valence of not less than 3, the method comprising a step (A-1) of reacting an active end polymer (hereinafter, the polymer is referred to as "active end polymer (I)".) represented by the following formula (I):

wherein P represents a polymer chain comprising at least one monomer unit selected from the group consisting of a conjugated diene unit and an aromatic vinyl compound unit, and X represents an active end of anionic polymerization; with a functional group-modified conjugated diene polymer (hereinafter, this polymer is referred to as "functional group-modified conjugated diene polymer (F)".) having, as a branched chain, a moiety comprising a functional group represented by the following formula (II) to thereby produce a conjugated diene graft polymer:

[Chem. 1]

wherein V represents an alkoxy group or a hydroxyl group, Z is Si, Sn, Ge, Pb, P, B, or Al, $R^1$ represents a $C_{6-12}$ aryl group, a $C_{1-12}$ alkyl group, or a hydrogen atom, N represents the valence of Z, and n is an integer satisfying the following expression (1):

$$1 \leq n \leq N-1 \tag{1}$$

wherein V(s) may be the same or different when n is not less than 2, $R^1(s)$ may be the same or different when N-n-1 is not less than 2, and Z(s) may be the same or different when a plurality of the branched chains relative to the main chain are comprised; and a step (B) of recovering the conjugated diene graft polymer obtained.

[2] The method for producing a conjugated diene graft polymer described in [1], further comprising:

a step (A-2) of at least partially deactivating at least one remaining functional group selected from the group consisting of an alkoxy group and a hydroxyl group in the conjugated diene graft polymer; before the step (B).

[3] The method for producing a conjugated diene graft polymer described in [1] or [2], wherein Z in the formula (II) is Si.

[4] The method for producing a conjugated diene graft polymer described in any one of [1] to [3], wherein the functional group V in the formula (II) is an alkoxy group.

[5] The method for producing a conjugated diene graft polymer described in any one of [1] to [4], wherein the average number of the side chains (b) bonded to one branching point is not less than 0.5.

[6] A conjugated diene graft polymer in which a side chain (b) comprising a polymer comprising at least one monomer unit selected from the group consisting of a conjugated diene unit and an aromatic vinyl compound unit is bonded to a main chain (a) comprising a polymer comprising a conjugated diene unit, via one hetero atom serving as a branching point and having a valence of not less than 3, wherein the main chain (a) is bonded to the branching point directly or through a linking chain,
the side chain (b) is directly bonded to the branching point,
the hetero atom is at least one selected from the group consisting of Si, Sn, Ge, Pb, P, B, and Al, and
the halogen content is not more than 1000 ppm.

[7] The conjugated diene graft polymer [6], obtained by the production method described in any one of [1] to [5].

[8] The conjugated diene graft polymer described in [6] or [7], wherein the hetero atom as the branching point is Si.

[9] The conjugated diene graft polymer described in any one of [6] to [8], wherein the average number of the side chains (b) directly bonded to one branching point is not less than 0.5.

[10] A polymer composition comprising the conjugated diene graft polymer described in any one of [6] to [9].

[11] A molded product obtained by molding the polymer composition described in [10].

Advantageous Effect of Invention

The present invention provides a conjugated diene graft polymer having high transparency, heat stability and weather resistance, and a method for producing the conjugated diene graft polymer.

DESCRIPTION OF EMBODIMENTS

The method for producing the conjugated diene graft polymer of the present invention includes the following step (A-1) and step (B). The graft polymer in the present invention refers to a polymer having, as a trunk, a main chain including a polymer chain, and having, as a branch, a side chain including a polymer chain, in which a monomer unit constituting the polymer chain serving as the main chain and a monomer unit constituting the polymer chain serving as the side chain may be the same or different.

a step (A-1) of reacting an active end polymer (I) represented by the following formula (I), with a functional group-modified conjugated diene polymer (F) having, as a branched chain, a moiety including a functional group represented by the following formula (II) to thereby produce a conjugated diene graft polymer:

P—X  (I)

wherein P represents a polymer chain including at least one monomer unit selected from the group consisting of a conjugated diene unit and an aromatic vinyl compound unit, and X represents an active end of anionic polymerization;

[Chem. 2]

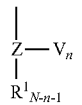

(II)

wherein V represents an alkoxy group or a hydroxyl group, Z is Si, Sn, Ge, Pb, P, B, or Al, $R^1$ represents a $C_{6-12}$ aryl group, a $C_{1-12}$ alkyl group, or a hydrogen atom, N represents the valence of Z, and n is an integer satisfying the following expression (1);

(1)

wherein V(s) may be the same or different when n is not less than 2, $R^1$(s) may be the same or different when N-n-1 is not less than 2, and Z(s) may be the same or different when a plurality of the branched chains relative to the main chain are comprised; and a step (B) of recovering the conjugated diene graft polymer obtained.

The branched chain of the functional group-modified conjugated diene polymer (F) means a moiety other than a main chain of the functional group-modified conjugated diene polymer (F), and this main chain refers to the entire moiety derived from all the monomer units including a conjugated diene unit constituting this main chain. For example, in a case where the functional group-modified conjugated diene polymer (F) is produced from an unmodified conjugated diene polymer (F') as a precursor by a method described below, this main chain refers to the entire moiety derived from the unmodified conjugated diene polymer (F'). For example, in a case where a butadiene unit having a vinyl bond is included in the unmodified conjugated diene polymer (F'), this main chain also includes a —CH═CH$_2$ moiety (—CH—CH$_2$— moiety in a case where a modifying compound is added) connected to a carbon atom in a polymer backbone (—(C—C)$_n$—).

[Step (A-1)]

The active end polymer (I) in the step (A-1) may be produced using a known polymerization method. For example, the active end polymer (I) may be obtained by anionic polymerization of a monomer in a solvent inert to a polymer end optionally in the presence of a polar compound, with an active metal or active metal compound capable of catalyzing anionic polymerization, as an initiator.

P included in the active end polymer (I) is a polymer chain including at least one monomer unit selected from the group consisting of a conjugated diene unit and an aromatic vinyl compound unit. P in the active end polymer corresponds to a side chain (b) of a graft polymer obtained by the present invention.

Examples of the conjugated dienes capable of constituting the monomer unit include butadiene and isoprene; and conjugated dienes other than butadiene and isoprene, such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, farnesene and chloroprene. It is preferable to include at least one monomer unit selected from the group consisting of butadiene and isoprene, as the conjugated diene unit included in P in the active end polymer (I). The conjugated dienes may be used singly, or two or more may be used in combination.

Examples of the aromatic vinyl compounds capable of constituting the monomer unit include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. Of these aromatic vinyl compounds, styrene, α-methylstyrene and 4-methylstyrene are preferable. The aromatic vinyl compounds may be used singly, or two or more may be used in combination.

P included in the active end polymer (I) may be a homopolymer including only one kind of the conjugated diene unit or one kind of the aromatic vinyl compound unit, as the backbone of the polymer chain, a copolymer including two or more kinds of the monomer units selected from the group consisting of the conjugated diene unit and the aromatic vinyl compound unit, or a copolymer of one or more kinds of the monomer units selected from the group consisting of the conjugated diene unit and the aromatic vinyl compound unit, and a monomer unit of a vinyl monomer other than the conjugated diene and the aromatic vinyl compound. The polymers constituting P in the active end polymer may be used singly or may be in the form of two or more kinds different in structure.

(Ratio of Conjugated Diene Unit)

The ratio of the conjugated diene unit capable of constituting P in the active end polymer (I) is not particularly limited, can be designed for any purpose, and is preferably not less than 50 mass %, more preferably not less than 60 mass %, and particularly preferably not less than 70 mass %, or may be 100 mass %. When the ratio of the conjugated diene unit is not less than 50 mass %, the processability of the obtainable conjugated diene graft polymer tends to be enhanced.

The ratio of the aromatic vinyl compound unit capable of constituting P in the active end polymer (I) is not particularly limited, can be designed for any purpose, is preferably not less than 50 mass %, more preferably not less than 60 mass %, and particularly preferably not less than 70 mass %, or may be 100 mass %. When the ratio of the aromatic vinyl compound unit is not less than 50 mass %, the mechanical properties of the obtainable conjugated diene graft polymer tend to be enhanced.

The active metal or active metal compound capable of catalyzing anionic polymerization is preferably an organoalkali metal compound and more preferably an organolithium compound. Examples of the organolithium compounds include methyllithium, ethyllithium, n-butyllithium, sec-butyllithium, tert-butyllithium and pentyllithium.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

A polar compound may also be added in the anionic polymerization. The polar compounds are generally used for the purpose of controlling the microstructure (vinyl content) of conjugated diene units without deactivation of the reaction of anionic polymerization. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol relative to 1 mol of the organoalkali metal compound.

The temperature of the anionic polymerization is usually in the range of −80 to 150° C., preferably in the range of 0 to 100° C., and more preferably in the range of 10 to 90° C. The polymerization mode may be batchwise or continuous.

The weight average molecular weight (Mw) of the active end polymer (I) is preferably not less than 1,000 and less than 100,000, more preferably not less than 2,000 and less than 50,000, and still more preferably not less than 3,000 and less than 50,000. When the Mw of the active end polymer (I) is in the above range, the process flow efficiency tends to be enhanced and good economic efficiency tends to be obtained. In the present invention, the Mw is the weight average molecular weight measured by gel permeation chromatography (GPC) relative to polystyrene standards, unless particularly noted.

The vinyl content in P included in the active end polymer (I) is not particularly limited, and is preferably not more than 90 mol %, more preferably not more than 80 mol %, and still more preferably not more than 70 mol %. The vinyl content in the active end polymer is preferably not less than 0.5 mol % and more preferably not less than 1 mol %. In the present invention, the "vinyl content" is the total molar percentage of 1,2-bonded, 3,4-bonded (any case other than farnesene) and 3,13-bonded (case of farnesene) conjugated diene units (conjugated diene units except 1,4-bonded (any case other than farnesene) and 1,13-bonded (case of farnesene)) in the conjugated diene unit included in the polymer, taken as 100 mol %. The vinyl content in the active end polymer (I) is determined by the area ratio of the peaks assigned to 1,2-bonded, 3,4-bonded (any case other than farnesene) and 3,13-bonded (case of farnesene) conjugated diene units and the peaks assigned to 1,4-bonded (any case other than farnesene) and 1,13-bonded (case of farnesene) conjugated diene units in a $^1$H-NMR spectrum of the active end polymer.

The vinyl content in P included in the active end polymer (I) can be designed for any purpose. For example, when the vinyl content is less than 50 mol %, the glass transition temperature (Tg) of a side chain (b), described later, tends to be lower, and the fluidity and the low-temperature characteristics of the obtainable conjugated diene graft polymer tend to be excellent. When the vinyl content is not less than 50 mol %, the reactivity of the obtainable conjugated diene graft polymer tends to be excellent.

The vinyl content may be brought to the desired value by selecting the types of a solvent and an optional polar compound used in the production of the active end polymer (I), or controlling the production conditions such as polymerization temperature.

The glass transition temperature (Tg) of P included in the active end polymer (I) is variable depending on factors such as the vinyl contents in the butadiene units, isoprene units and butadiene units, the vinyl contents in conjugated diene units other than the isoprene units, the type of the conjugated diene unit, and the content of units derived from monomers other than the conjugated dienes, but is preferably −150 to 50° C., more preferably −130 to 50° C., and still more preferably −130 to 30° C. For example, this Tg ensures that the increase in viscosity is suppressed and the polymer can be handled easily. In the present invention, the Tg is a peak top value of DDSC, determined by differential scanning calorimetry (DSC) measurement.

In the step (A-1), the functional group-modified conjugated diene polymer (F) is obtained by, for example, modifying the unmodified conjugated diene polymer (F') by a functional group in a modification step described later. The method for producing the unmodified conjugated diene polymer (F') is not particularly limited, and is preferably, emulsion polymerization or solution polymerization, and more preferably solution polymerization from the point of view of the molecular weight distribution of the obtainable polymer. A moiety of the functional group-modified conjugated diene polymer (F), corresponding to a moiety other than a functional group-modified moiety, serves as the main chain (a) of the conjugated diene graft polymer of the present invention.

Specific examples of the conjugated dienes included in the monomer units of the unmodified conjugated diene polymer (F') are the same as specific examples of the conjugated dienes capable of constituting the monomer units of P included in the active end polymer (I). Of the conjugated dienes serving as the conjugated diene units included in the unmodified conjugated diene polymer (F'), butadiene and isoprene are preferable, and butadiene is more preferable. The conjugated dienes may be used singly, or two or more may be used in combination.

The unmodified conjugated diene polymer (F') preferably contains at least one monomer unit selected from the group consisting of butadiene and isoprene in an amount of not less than 50 mass % relative to all the monomer units constituting the polymer. The total content of butadiene units and isoprene units is preferably 60 to 100 mass %, and more preferably 70 to 100 mass % relative to all the monomer units forming the unmodified conjugated diene polymer (F').

Besides the butadiene units and the isoprene units, the unmodified conjugated diene polymer (F') may contain other monomer units such as units from the aforementioned conjugated dienes except butadiene and isoprene, and units from aromatic vinyl compounds.

Specific examples of the aromatic vinyl compounds capable of constituting the monomer units of the unmodified conjugated diene polymer (F') are the same as specific examples of the aromatic vinyl compounds capable of constituting the monomer units of P included in the active end polymer (I). Of these aromatic vinyl compounds, styrene, α-methylstyrene and 4-methylstyrene are preferable. The aromatic vinyl compounds may be used singly, or two or more may be used in combination.

In the unmodified conjugated diene polymer (F'), the content of the monomer units other than the butadiene and isoprene units is preferably not more than 50 mass %, more preferably not more than 40 mass %, and still more preferably not more than 30 mass %. For example, when the aromatic vinyl compound unit is within the above range, the processability of the obtainable conjugated diene graft polymer tends to be enhanced and the reactivity in modification by a functional group described later tends to be enhanced.

The weight average molecular weight (Mw) of the unmodified conjugated diene polymer (F') is preferably not less than 1,000 and less than 1,000,000, more preferably not less than 2,000 and less than 500,000, and still more preferably not less than 3,000 and less than 100,000. When the Mw of the unmodified conjugated diene polymer (F') is in the above range, the process flow efficiency tends to be enhanced and good economic efficiency tends to be obtained.

The vinyl content in the unmodified conjugated diene polymer (F') is not particularly limited, and is preferably not more than 90 mol %, more preferably not more than 80 mol %, and still more preferably not more than 70 mol %. The vinyl content in the main chain (a) is preferably not less than 0.5 mol %, and more preferably not less than 1 mol %.

The vinyl content in the unmodified conjugated diene polymer (F') can be designed for any purpose. For example, when the vinyl content is less than 50 mol %, the glass transition temperature (Tg) of the main chain (a) in the conjugated diene graft polymer, described later, tends to be lower, and the fluidity and the low-temperature characteristics of the obtainable conjugated diene graft polymer tend to be excellent. When the vinyl content is not less than 50 mol %, the reactivity of the obtainable conjugated diene graft polymer tends to be excellent.

The vinyl content in the unmodified conjugated diene polymer (F') may be brought to the desired value by selecting the types of a solvent and an optional polar compound used in the production of the unmodified conjugated diene polymer (F'), or controlling the production conditions such as polymerization temperature.

The glass transition temperature (Tg) of the unmodified conjugated diene polymer (F') is variable depending on factors such as the vinyl contents in the conjugated diene units, the type of the conjugated diene unit, and the content of units derived from monomers other than the conjugated dienes, but is preferably −150 to 50° C., more preferably −130 to 50° C., and still more preferably −130 to 30° C. For example, this Tg ensures that the increase in viscosity is suppressed and the polymer can be handled easily.

The emulsion polymerization process as one exemplary method for producing the unmodified conjugated diene polymer (F') may be a known process or a process that is deemed as known. For example, monomers including a prescribed amount of the conjugated diene may be emulsified and dispersed in a dispersion medium in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as the dispersion medium. The dispersion medium may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the obtainable unmodified conjugated diene polymer (F'), a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the unmodified conjugated diene polymer (F') is coagulated by the addition of a coagulant salt such as sodium chloride, calcium chloride or potassium chloride optionally together with an acid such as nitric acid or sulfuric acid to control the pH of the coagulated system to a predetermined value. The dispersion solvent is then separated, thereby recovering the polymer. Next, the polymer is washed with water, dehydrated and dried. In this manner, the unmodified conjugated diene polymer (F') may be obtained. During the coagulation process, the latex may be mixed together with an emulsified dispersion of an extender oil as required, and the unmodified conjugated diene polymer (F') may be recovered as an oil-extended rubber.

The solution polymerization process as one exemplary method for producing the unmodified conjugated diene polymer (F') may be a known process or a process that is deemed as known. For example, monomers including the conjugated diene are polymerized in a solvent with a Ziegler catalyst, a metallocene catalyst, an active metal or an active metal compound capable of catalyzing anionic polymerization as an initiator, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

The initiator is preferably an active metal or active metal compound capable of catalyzing anionic polymerization, and more preferably an active metal compound capable of catalyzing anionic polymerization.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of these, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount of the initiators used may be determined appropriately in accordance with the melt viscosities and molecular weights of the unmodified conjugated diene polymer (F') and the functional group-modified conjugated diene polymer (F). Usually, the amount of such compounds is 0.01 to 3 parts by mass per 100 parts by mass of all the monomers including the conjugated diene.

When the organoalkali metal compound is used as an initiator, the organoalkali metal compound may be used in the form of an organoalkali metal amide by being subjected to a reaction with a secondary amine such as dibutylamine, dihexylamine or dibenzylamine.

The polar compounds are usually used for the purpose of controlling the microstructure of conjugated diene units (vinyl content) without deactivating the anionic polymerization reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol relative to 1 mol of the organoalkali metal compound.

The temperature of the solution polymerization is usually in the range of −80 to 150° C., preferably 0 to 100° C., and more preferably 10 to 90° C. The polymerization mode may be batchwise or continuous.

The polymerization reaction in the solution polymerization may be terminated by the addition of a polymerization terminator. Examples of the polymerization terminators include alcohols such as methanol and isopropanol. The unmodified conjugated diene polymer (F') may be isolated by pouring the polymerization reaction liquid into a poor solvent such as methanol to precipitate the unmodified conjugated diene polymer (F'), or by washing the polymerization reaction liquid with water followed by separation and drying.

The method for producing the functional group-modified conjugated diene polymer (F) having, as a branched chain, the moiety having the functional group represented by the formula (II), by the modification of the unmodified conjugated diene polymer (F') by the functional group is not particularly limited, and is, for example, a method for introducing the functional group derived from the alkoxysilane compound by radically adding a compound having a mercapto group (—SH) to a carbon-carbon unsaturated bond present in the unmodified conjugated diene polymer (F'), or a method for introducing the functional group derived from the alkoxysilane compound by hydrosilylating a carbon-carbon unsaturated bond present in the unmodified conjugated diene polymer (F') in the presence of a platinum compound-containing catalyst and optionally a co-catalyst as required, from the point of view of introduction of a functional group having a preferable structure. Of these production methods, a method including radically adding a compound having a mercapto group (—SH) is preferable from the point of view of availability of a modification reagent and catalyst, and production cost. And a method for introducing the functional group derived from the alkoxysilane compound by hydrosilylation is preferable from the point of view of the stability of the obtainable functional group-modified conjugated diene polymer (F).

The method for introducing the functional group derived from the alkoxysilane compound by radically adding a compound having a mercapto group (—SH) to a carbon-carbon unsaturated bond present in the unmodified conjugated diene polymer (F') is preferably a method including radically adding a silane compound (IV) represented by the following formula (IV) to a carbon-carbon unsaturated bond present in the unmodified conjugated diene polymer (F').

[Chem. 3]

formula (IV)

In the formula (IV), $R^4$ is a $C_{1-6}$ divalent alkylene group, $R^5$ and $R^6$ are each independently a $C_{6-12}$ aryl group, a $C_{1-12}$ alkyl group, or a hydrogen atom, n is an integer of 1 to 3, $R^5$(s) may be the same or different when n is not less than 2, and $R^6$(s) may be the same or different when 3-n is not less than 2.

Examples of the silane compounds (IV) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane and 3-mercaptopropylethoxydimethylsilane. The silane compounds may be used singly, or two or more may be used in combination.

The mercapto group (—SH) of the silane compound (IV) is radically added to a carbon-carbon unsaturated bond present in the unmodified conjugated diene polymer (F'). The resultant functional group-modified conjugated diene polymer (F) has the functional group derived from the silane compound (IV), specifically, a functional group that is the partial structure represented by the following formula (V):

[Chem. 4]

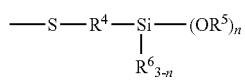

formula (V)

Details of definitions of $R^4$, $R^5$, $R^6$ and n in the formula (V) are the same as those in the formula (IV).

The silane compound (IV) may be added to the unmodified conjugated diene polymer (F') by any method without limitation. For example, the silane compound (IV) and optionally a radical generator as required may be added to the unmodified conjugated diene polymer (F') and the mixture may be heated in the presence of or without an organic solvent. The radical generator that is used is not particularly limited and may be any of, among others, organic peroxides, azo compounds and hydrogen peroxide that are usually available in the market.

Examples of the organic peroxides include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 1,1-bis(t-hexylperoxy)cyclohexane, 2,2-bis(t-butylperoxy)butane, t-butylhydroperoxide, cumenehydroperoxide, diisopropylbenzene hydroperoxide, p-menthane hydroperoxide, 2,5-dimethylhexane 2,5-dihydroperoxide, 1,1,3,3-tetramethylbutyl hydroperoxide, di-t-butyl peroxide, t-butyl cumyl peroxide, dicumyl peroxide, bis(t-butylperoxyisopropyl)benzene, 2,5-dimethyl-2,5-di(t-butylperoxy)hexane, 2,5-hexanoyl peroxide, lauroyl peroxide, succinic acid peroxide, benzoyl peroxide and derivatives thereof, 2,4-dichlorobenzoyl peroxide, m-toluoyl peroxide, diisopropyl peroxydicarbonate, t-butyl-2-ethyl hexanoate, di-2-ethylhexyl peroxydicarbonate, dimethoxyisopropyl peroxycarbonate, di(3-methyl-3-methoxybutyl) peroxydicarbonate, t-butyl peroxyacetate, t-butyl peroxypivalate, t-butyl peroxyneodecanoate, t-butyl peroxyoctanoate, t-butyl peroxy-3,3,5-trimethylhexanoate, t-butyl peroxylaurate, t-butyl peroxycarbonate, t-butyl peroxybenzoate and t-butyl peroxyisobutyrate.

Examples of the azo compounds include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), 2,2'-azobis(2,4-dimethyl-4-methoxyvaleronitrile), 2,2'-azobis(2-(2-imidazolin-2-yl)propane), 2,2'-azobis(2,4,4-trimethylpentane), 2,2'-azobis(2-methylpropane), 2,2'-azobis(2-hydroxymethylpropionitrile), 4,4'-azobis(4-cyanovaleric acid), dimethyl 2,2'-azobis(2-methylpropionate), 2-cyano-2-propylazoformamide and 2-phenylazo-4-methoxy-2,4-dimethylvaleronitrile.

The radical generators may be used singly, or two or more may be used in combination.

For example, the organic solvent used in the above method is usually a hydrocarbon solvent or a halogenated hydrocarbon solvent. Of these organic solvents, hydrocarbon solvents such as n-butane, n-hexane, n-heptane, cyclohexane, benzene, toluene and xylene are preferable.

The organic solvents may be used singly, or two or more may be used in combination.

For purposes such as to suppress side reactions during the addition reaction of the modifying agent by the aforementioned method, an antioxidant may be added.

Some preferred examples of the antioxidants used for such purposes include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount of the antioxidant added is preferably 0 to 10 parts by mass, and more preferably 0 to 5 parts by mass per 100 parts by mass of the unmodified conjugated diene polymer (F').

The addition reaction of the silane compound (IV) to the unmodified conjugated diene polymer (F') preferably takes place at a temperature of 10 to 200° C., and more preferably 50° C. to 180° C. The reaction time is preferably 1 to 200 hours, more preferably 1 to 100 hours, and still more preferably 1 to 50 hours.

The method for introducing the functional group derived from the alkoxysilane compound by hydrosilylating a carbon-carbon unsaturated bond present in the unmodified conjugated diene polymer (F') in the presence of a platinum compound-containing catalyst and optionally a co-catalyst as required is preferably a method including hydrosilylating a carbon-carbon unsaturated bond present in the unmodified conjugated diene polymer (F') by a silane compound (VI) represented by the following formula (VI) in the presence of a platinum compound-containing catalyst, preferably in the presence of a platinum compound-containing catalyst and a co-catalyst.

[Chem. 5]

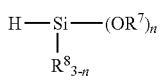

formula (VI)

In the formula (VI), $R^7$ and $R^8$ are each independently a $C_{6-12}$ aryl group or a $C_{1-12}$ alkyl group, n is an integer of 1 to 3, $R^7$(s) may be the same or different when n is not less than 2, and $R^8$(s) may be the same or different when 3-n is not less than 2.

Examples of the silane compounds (VI) include trimethoxysilane, methyldimethoxysilane, dimethylmethoxysilane, triethoxysilane, methyldiethoxysilane, and dimethylethoxysilane. The silane compounds may be used singly, or two or more may be used in combination.

A carbon-carbon unsaturated bond present in the unmodified conjugated diene polymer (F') is hydrosilylated by the silane compound (VI). The resultant functional group-modified conjugated diene polymer (F) has the functional group derived from the silane compound (VI), specifically, a functional group that is the partial structure represented by the following formula (VII):

[Chem. 6]

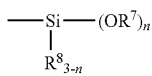

formula (VII)

Details of definitions of $R^7$, $R^8$ and n in the formula (VII) are the same as those in the formula (IV).

The platinum compound-containing catalyst for use in the hydrosilylation reaction is not particularly limited, and examples include chloroplatinic acid, alcohol solutions of chloroplatinic acid, toluene or xylene solutions of platinum-1,3-divinyl-1,1,3,3-tetramethyldisiloxane complexes, tetrakistriphenylphosphine platinum, dichlorobistriphenylphosphine platinum, dichlorobisacetonitrile platinum, dichlorobisbenzonitrile platinum, dichlorocyclooctadiene platinum, and supported catalysts such as platinum-carbon, platinum-alumina and platinum-silica.

A zero-valent platinum complex is preferable, and a toluene or xylene solution of a platinum-1,3-divinyl-1,1,3,3-tetramethyldisiloxane complex is more preferable, in terms of selectivity in hydrosilylation.

The amount of the platinum compound-containing catalysts used is not particularly limited, and the amount per mol of the silane compound (VI) is preferably $1 \times 10^{-7}$ to $1 \times 10^{-2}$ mol and more preferably $1 \times 10^{-7}$ to $1 \times 10^{-3}$ mol in terms of platinum atom contained, from the point of view of reactivity, productivity, and the like.

The co-catalyst in the reaction is preferably one or more selected from an ammonium salt of inorganic acid, an acid amide compound and a carboxylic acid.

Examples of the ammonium salts of inorganic acid include ammonium chloride, ammonium sulfate, ammonium amide sulfate, ammonium nitrate, monoammonium dihydrogen phosphate, diammonium hydrogen phosphate, triammonium phosphate, ammonium hypophosphite, ammonium carbonate, ammonium hydrogen carbonate, ammonium sulfide, ammonium borate, and ammonium borofluoride. Of these, an ammonium salt of inorganic acid having a pKa of not less than 2 is preferable, and ammonium carbonate and ammonium hydrogen carbonate are more preferable.

Examples of the acid amide compounds include formamide, acetamide, N-methylacetamide, N,N-dimethylacetamide, propionamide, acrylamide, malonamide, succinamide, maleimide, fumaramide, benzamide, phthalamide, palmitic acid amide, and stearic acid amide.

Examples of the carboxylic acids include formic acid, acetic acid, propionic acid, butyric acid, methoxyacetic acid, pentanoic acid, caproic acid, heptanoic acid, octanoic acid, lactic acid, and glycolic acid. Of these, formic acid, acetic acid, and lactic acid are preferable, and acetic acid is more preferable.

The amount of the co-catalyst used is not particularly limited, and the amount per mol of the silane compound (VI) is preferably $1 \times 10^{-3}$ to $5 \times 10^{-1}$ mol and more preferably $1 \times 10^{-4}$ to $5 \times 10^{-1}$ mol, from the point of view of reactivity, selectivity, cost, and the like.

The hydrosilylation reaction, although may progress without a solvent, may also progress with a solvent. Examples of the usable solvents include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotonic polar solvents such as N,N-dimethylformamide; and chlorinated hydrocarbon solvents such as dichloromethane and chloroform. The solvents may be used singly, or two or more may be used as a mixture.

The reaction temperature in the hydrosilylation reaction is not particularly limited, and the reaction may be usually performed at a temperature of not less than 0° C., preferably 0 to 200° C., and may be performed under heating conditions as required. The reaction is preferably performed under heating for the purpose of achieving an appropriate reaction speed, and the reaction temperature is more preferably 40 to 110° C., and still more preferably 40 to 90° C. from this point of view. The reaction time is also not particularly limited and is usually about 1 to 60 hours, preferably 1 to 30 hours, and more preferably 1 to 20 hours.

In the functional group-modified conjugated diene polymer (F), the functional groups each having the partial structure represented by the formula (V) or formula (VII) may belong to a single kind or may be a mixture of two or more kinds. That is, the functional group-modified conjugated diene polymer (F) may be a diene polymer modified by one compound or two or more compounds selected from the group consisting of the silane compound (IV) and the silane compound (VI).

Z in the formula (II) is preferably Si or Sn, and more preferably Si from the point of view of the transparency, heat stability and weather resistance of the obtainable conjugated diene graft polymer.

V in the formula (II) is preferably an alkoxy group, more preferably a $C_{1-5}$ alkoxy group, and particularly preferably a methoxy group and an ethoxy group from the point of view of the transparency, heat stability and weather resistance of the obtainable conjugated diene graft polymer, and the reactivity in a coupling step described later.

In the formula (II), n is an integer satisfying the formula (1), and is preferably not less than 2, more preferably not less than 3, and particularly preferably the same as the valence of Z from the point of view of the reactivity in a coupling step described later, and control of the number of side chains bonded to a branching point of the obtainable conjugated diene graft polymer.

The average number of the moieties represented by the formula (II) per molecule of the functional group-modified conjugated diene polymer (F) is preferably 1 to 50, more preferably 2 to 30, and still more preferably 3 to 20.

The average number of the functional groups V in the formula (II) per molecule of the functional group-modified conjugated diene polymer (F) is preferably 2 to 150, more preferably 4 to 90, and still more preferably 6 to 60.

The average number of the functional groups V in the formula (II) per molecule of the functional group-modified conjugated diene polymer (F) is determined from the functional group equivalent weight (g/eq) of the functional group V in the functional group-modified conjugated diene polymer (F), and the standard polystyrene equivalent number average molecular weight (Mn), by the following expression (3).

(Average number of functional groups $V$ in formula (II) per molecule of functional group-modified conjugated diene polymer $(F)$)=[(Number average molecular weight Mn)/(Molecular weight of styrene unit)×(Average molecular weight of units of conjugated diene and optional monomers other than conjugated dienes)]/(Functional group equivalent weight of functional group $V$)  (3)

The functional group equivalent weight of the functional group V in the functional group-modified conjugated diene polymer (F) indicates the mass of conjugated diene and optional monomers other than conjugated diene that are bonded together per one functional group V. The functional group equivalent weight is calculated from the ratio of the area of the peak assigned to the polymer main chains to the area of the peak assigned to the functional groups using $^1$H-NMR. The peaks assigned to the functional groups V are peaks assigned to alkoxy groups and hydroxyl groups.

The ratio in which the unmodified conjugated diene polymer (F') and the silane compound (IV) or the silane compound (VI) are mixed together may be selected appropriately so that, for example, the functional group-modified conjugated diene polymer (F) will have the desired average number of functional groups V in the formula (II) per molecule. For example, the unmodified conjugated diene polymer (F') and the silane compound (IV) or the silane compound (VI) may be mixed in a mass ratio of 0.3 to 100.

Suitable ranges of the Mw of the functional group-modified conjugated diene polymer (F) and the vinyl content in the polymer are the same as those with respect to the unmodified conjugated diene polymer (F').

The melt viscosity of the functional group-modified conjugated diene polymer (F), measured at 38° C., is preferably 0.1 to 2,000 Pa·s, more preferably 0.1 to 1500 Pa·s, and still more preferably 0.1 to 1000 Pas. When the melt viscosity of the functional group-modified conjugated diene polymer (F) is in the above range, the process flow efficiency tends to be enhanced and good economic efficiency tends to be obtained. In the present invention, the melt viscosity of the conjugated diene graft polymer is a value measured with a Brookfield viscometer at 38° C.

In the step (A-1), a reaction of the active end polymer (I) and the functional group-modified conjugated diene polymer (F) leads to a substitution reaction of the functional group V in the moiety represented by the formula (II) and the active end polymer (I), thereby forming a conjugated diene graft polymer in which the active end polymer (I) serving as a side chain is bonded to a hetero atom Z serving as a branching point (hereinafter, this reaction is referred to as "coupling reaction"). When an unreacted functional group V (at least one remaining functional group selected from the group consisting of an alkoxy group and a hydroxyl group) is present in the conjugated diene graft polymer in the coupling reaction and a deactivation step described later, such a functional group V remains as it is or is hydrolyzed, thereby forming at least one functional group (c) selected from the group consisting of an alkoxy group and a hydroxyl group, bonded to a branching point of the conjugated diene graft polymer, described later.

If a polymer having a silyl chloride group as a reactive functional group as described in Non Patent Literature 1 is used as one raw material in the production of a conjugated diene graft polymer by the reaction of two kinds of polymers as described above, a halide is produced as a by-product. This halide tends to cause deteriorations in transparency, heat resistance and weather resistance of the obtainable conjugated diene graft polymer. Chlorosilanes for use in synthesis of the polymer having a silyl chloride group as a reactive functional group have very high reactivity and also high hazardousness, and thus are problematic in terms of handleability.

The average number W of the side chains (b) directly bonded to the branching point per molecule of the conjugated diene graft polymer may be adjusted in a desired range by the ratio of the amount of the active end polymer (I) loaded and the amount of the functional group-modified conjugated diene polymer (F) loaded in the coupling reaction. For example, when the (Amount (molar number) of active end polymer (I) loaded)/(Amount (molar number) of functional group-modified conjugated diene polymer (F) loaded) is 4/1, the average number W of the side chains (b) is 4. Herein, the upper limit of W is the number of the functional groups V per molecule of the functional group-modified conjugated diene polymer (F).

The molar ratio of (Amount of active end polymer (I) loaded)/(Amount of functional group-modified conjugated diene polymer (F) loaded) may be appropriately set so that the average number W of the side chains (b) directly bonded to the branching point per molecule of the conjugated diene graft polymer is brought to the desired value, and is, for example, preferably 1 to 200, more preferably 2 to 100, and still more preferably 3 to 50. If the molar ratio of (Amount of active end polymer (I) loaded)/(Amount of functional group-modified conjugated diene polymer (F) loaded) is less than 1, the number of side chains which may be introduced is decreased, and if the molar ratio is more than 200, the rate of coupling described later tends to be reduced.

The coupling reaction is usually performed in the temperature range of 0 to 100° C. for 0.5 to 50 hours. The functional group-modified conjugated diene polymer (F) may be diluted and then used, a dilution solvent is not particularly limited as long as it is inert to the active end and has no adverse effect on the reaction, and examples include saturated aliphatic hydrocarbons or aromatic hydrocarbons, such as hexane, cyclohexane, heptane, octane, decane, toluene, benzene and xylene.

An additive added in the coupling reaction may be a Lewis base. Examples of the Lewis bases include ethers such as dimethyl ether, diethyl ether and tetrahydrofuran; glycol ethers such as ethylene glycol dimethyl ether and diethylene glycol dimethyl ether; and amines such as triethylamine, N,N,N',N'-tetramethylethylenediamine and N-methylmorpholine. The Lewis bases may be used singly, or two or more may be used in combination.

In the coupling reaction, the functional group-modified conjugated diene polymer (F) may be placed in a reaction vessel in which the active end polymer (I) is synthesized, or on the contrary, the active end polymer (I) may be added to the functional group-modified conjugated diene polymer (F). The active end polymer (I) and the functional group-modified conjugated diene polymer (F) may be each optionally diluted with a solvent and then used. The active end polymers (I) may be used singly, or two or more may be used in combination, and the functional group-modified conjugated diene polymers (F) may also be used singly, or two or more may also be used in combination.

The rate of coupling in the coupling reaction is preferably not less than 50%, more preferably not less than 60%, and still more preferably not less than 70%. A rate of coupling of less than 50% is not preferable because the mechanical properties of the obtainable conjugated diene graft polymer deteriorate. The rate of coupling is determined with the area of the peak assigned to a component derived from an unreacted active end polymer (I) in coupling and the sum of the areas of all the peaks obtained in GPC measurement, by the following formula (4).

(Rate of coupling (%))=[{(Sum of areas of all peaks)−(Peak area of component derived from active end polymer (I))}/(Sum of areas of all peaks)]×100    (4)

The rate of coupling may be enhanced by increasing the amount of the functional group-modified conjugated diene polymer (F) added, increasing the amount of the Lewis base added, raising the reaction temperature, and/or elongating the reaction time. The coupling reaction may be performed until the rate of coupling is in a desired range. Thereafter, the coupling reaction may be terminated by the addition of a polymerization terminator such as methanol or isopropanol.

The number of functional groups each corresponding to at least one functional group (c) selected from the group consisting of an alkoxy group and a hydroxyl group, which may be directly bonded to the branching point, may be adjusted in a desired range by the molar ratio of the amount of the active end polymer (I) loaded and the amount of the functional group-modified conjugated diene polymer (F) loaded in the coupling reaction, the amount of reagents used and the reaction time in a step of at least partially deactivating at least one remaining functional group selected from the group consisting of an alkoxy group and a hydroxyl group (unreacted functional group V) described below, and the type of an optional polar compound and the amount thereof added.

[Step (A-2)]

The method for producing the conjugated diene graft polymer of the present invention preferably includes a step (A-2) of at least partially deactivating at least one remaining functional group selected from the group consisting of an alkoxy group and a hydroxyl group (functional group V present in the form of an unreacted form) in the conjugated diene graft polymer (hereinafter, referred to as "deactivation step")

for the purpose of adjustment of the number of functional groups (c) directly bonded to the branching point in a desired range, after the step (A-1).

The deactivation step (A-2) is preferably performed before a recovery step (B) because it is considered that water and an acid added in the recovery step (B) lead to a reaction of an alkoxy group in the obtainable conjugated diene graft polymer to generate a hydroxyl group to thereby cause relatively many hydroxyl groups to be included, easily resulting in a condensation reaction of such many hydroxyl groups.

Examples of reagents for use in deactivation of an alkoxy group and an hydroxyl group (hereinafter, sometimes referred to as "deactivation reagent") include Lewis bases, for example, alkyllithiums such as methyllithium, ethyllithium, n-propyllithium, isopropyllithium, n-butyllithium, sec-butyllithium and t-butyllithium; alkylsodiums such as methylsodium, ethylsodium, n-propylsodium, isopropylsodium, n-butylsodium, sec-butylsodium and t-butylsodium; alkylpotassiums such as methylpotassium, ethylpotassium, n-propylpotassium, isopropylpotassium, n-butylpotassium, sec-butylpotassium and t-butylpotassium; alkylmagnesium halides such as methylmagnesium bromide, ethylmagnesium bromide, t-butylmagnesium bromide, t-butylmagnesium chloride and sec-butylmagnesium iodide; dialkyl copper lithiums such as dimethyl copper lithium, diethyl copper lithium, methyl ethyl copper lithium, methyl n-propyl copper lithium and ethyl n-butyl copper lithium; and lithium amides such as lithium diisopropyl amide, lithium diisoethyl amide and lithium di-t-butyl amide. Of these, n-butyllithium, sec-butyllithium, methyllithium, methylmagnesium bromide and dimethyl copper lithium are preferable because steric hindrance is desirably small for the purpose of rapid progression of the deactivation reaction.

The molar ratio, amount of deactivation reagents used in step (A-2)/Total amount of alkoxy group and hydroxyl group derived from group V in conjugated diene graft polymer obtained in step (A-1), is preferably not less than 0.5, more preferably not less than 1.0, and still more preferably not less than 2.0. The molar ratio is preferably not more than 100, more preferably not more than 50, and still more preferably not more than 20. If the amount of the deactivation reagent is small, the number of functional groups (c) which may be directly bonded to the branching point cannot be adjusted in a desired range, and if the amount of the deactivation reagent is large, poor economic efficiency tends to be obtained.

The deactivation reaction in the step (A-2) is usually performed in the temperature range of 0 to 100° C. for 0.1 to 50 hours. The deactivation reagent may be diluted and then used, a dilution solvent is not particularly limited as long as it is inert to the deactivation reagent and has no adverse effect on the reaction, and examples include saturated aliphatic hydrocarbons or aromatic hydrocarbons, such as hexane, cyclohexane, heptane, octane, decane, toluene, benzene and xylene. An additive added in the deactivation reaction may be a Lewis base, and examples of the Lewis bases include ethers such as dimethyl ether, diethyl ether and tetrahydrofuran; glycol ethers such as ethylene glycol dimethyl ether and diethylene glycol dimethyl ether; and amines such as triethylamine, N,N,N',N'-tetramethylethylenediamine and N-methylmorpholine. The Lewis bases may be used singly, or two or more may be used in combination.

The deactivation reaction may be performed until the number of the functional groups (c) which may be directly bonded to the branching point is in a desired range. Thereafter, the deactivation reagent may be deactivated by the addition of a polymerization terminator such as methanol or isopropanol.

[Step (B)]

The method for producing the conjugated diene graft polymer of the present invention includes a step (B) of recovering the conjugated diene graft polymer obtained.

In the step (B), the conjugated diene graft polymer obtained of the present invention is recovered. The method for recovering the conjugated diene graft polymer is not particularly limited, and when a solution including the conjugated diene graft polymer is obtained in the step (A-1) or step (A-2), the conjugated diene graft polymer may be recovered by, for example, pouring the solution obtained, into a poor solvent such as methanol, to precipitate the conjugated diene graft polymer, or by washing the polymerization reaction liquid with water followed by separation and drying, to thereby isolate the conjugated diene graft polymer.

The conjugated diene graft polymer obtained by the production method of the present invention is a conjugated diene graft polymer in which a side chain (b) including a polymer including at least one monomer unit selected from the group consisting of a conjugated diene unit and an aromatic vinyl compound unit is bonded to a main chain (a) including a polymer including a conjugated diene unit, via a hetero atom Z serving as a branching point and having a valence of not less than 3.

<Main Chain (a)>

The conjugated diene graft polymer of the present invention has a main chain (a) including a polymer including a conjugated diene unit. The main chain included in the conjugated diene graft polymer of the present invention refers to the entire moiety derived from all the monomer units including a conjugated diene unit constituting the main chain, as in the main chain of the functional group-modified conjugated diene polymer (F).

The main chain (a) preferably does not include any unit (for example, a unit having a Si atom and a N atom derived from the residue of the coupling agent) other than vinyl monomer units derived from vinyl monomers such as conjugated diene and an aromatic vinyl compound in the polymer chain backbone. If the main chain backbone includes the unit other than vinyl monomer units, the main chain backbone tends to be cleaved in conditions in which a bond of carbon and a hetero atom as a branching point described later is broken, or by shear or heat, easily resulting in deteriorations in properties. An end of the polymer chain serving as the main chain may have a group other than monomer units.

Specific examples, suitable examples and suitable contents with respect to conjugated dienes serving as the conjugated diene units constituting the polymer of the main chain (a), as well as specific examples, suitable examples, suitable contents, and suitable modes such as the weight average molecular weight (Mw), the vinyl content and the Tg, with respect to monomers (for example, aromatic vinyl compound) other than conjugated dienes serving as the monomer units constituting the polymer, are as described with respect to the unmodified conjugated diene polymer (F').

<Side Chain (b)>

The conjugated diene graft polymer of the present invention has a side chain (b) including a polymer including at least one monomer unit selected from the group consisting of a conjugated diene unit and an aromatic vinyl compound unit.

Specific examples, suitable examples and suitable contents with respect to conjugated dienes serving as the conjugated diene units constituting the polymer of the side chain (b), as well as specific examples, suitable examples, suitable contents, and suitable modes such as the weight average molecular weight (Mw), the vinyl content and the Tg, with respect to monomers (for example, aromatic vinyl compound) other than conjugated dienes serving as the monomer units constituting the polymer, are as described with respect to the active end polymer (I).

The side chain (b) preferably does not include any unit (for example, a unit having a Si atom and a N atom derived from the residue of the coupling agent) other than vinyl monomer units derived from vinyl monomers such as conjugated diene and an aromatic vinyl compound in the polymer chain backbone. If the polymer chain backbone of the side chain (b) includes the unit other than vinyl monomers, the polymer chain backbone of the side chain (b) tends to be cleaved in conditions in which a bond of carbon and a hetero atom as a branching point described later is broken, or by shear or heat, easily resulting in deteriorations in properties. An end of the polymer chain serving as the side chain may have a group other than monomer units.

<Conjugated Diene Graft Polymer>

The side chain (b) is bonded to the main chain (a) via one hetero atom serving as a branching point and having a valence of not less than 3, in the conjugated diene graft polymer obtained in the present invention.

The main chain (a) is bonded to the branching point directly or through a linking chain, and the side chain (b) is directly bonded to the branching point. Here, the "directly bonded to the branching point" means that a hetero atom serving as the branching point is directly bonded to a moiety derived from the monomer units constituting the main chain. The "bonded through a linking chain to the branching point" means that one end serving as the linking chain is bonded to a moiety derived from the monomer units constituting the main chain and a hetero atom serving as the branching point is directly bonded to other end of the linking chain. For example, when the branching point is bonded to a 1,2-bonded butadiene unit, a case represented by the following formula (III-1) corresponds to a case of direct bonding of the branching point to the main chain, and a case represented by the following formula (III-2) corresponds to a case of bonding of the branching point through the linking chain to the main chain.

[Chem. 7]

(III-1)

(III-2)

In the formulae (III-1) and (III-2), $Z^0$ is a hetero atom serving as the branching point, and $R^{2a}$ is the linking chain. Rea is a divalent organic group, and is preferably an alkylene group optionally having a hetero atom.

A chemical formula representing a branched moiety from the main chain, including a bonding form of the main chain (a) and the branching point, is a branched moiety including a direct bonding form of the branching point to the main chain (a), as in the following formula (III-3), and a branched moiety including a bonding form to the branching point through the linking chain, as in the following formula (III-4). Of these branched moieties, a branched structure of bonding to the branching point through the linking chain as in the formula (III-4) is desirable.

[Chem. 8]

(III-3)

-continued

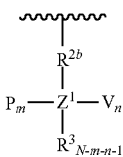
(III-4)

In the formulae (III-3) and (III-4), a wavy line moiety is the main chain (a), $Z^1$ is the branching point, P is the side chain (b), and $R^{2b}$ is the linking chain. V is a functional group (c) optionally included in the conjugated diene graft polymer of the present invention described later.

In the formulae (III-3) and (III-4), $Z^1$ is Si, Sn, Ge, Pb, P, B, or Al, $R^{2b}$ represents a $C_{1-12}$ alkylene group optionally having a hetero atom, $R^3$ represents a $C_{6-12}$ aryl group, a $C_{1-12}$ alkyl group, or a hydrogen atom, P represents a polymer chain including at least one monomer unit selected from the group consisting of a conjugated diene unit and an aromatic vinyl compound unit, and V represents an alkoxy group or a hydroxyl group. N represents the valence of Z, m and n are each independently an integer satisfying the following formula (5);

$$0 \le m \le N-1, \ 0 \le n \le N-1 \qquad (5)$$

P(s) may be the same or different when m is not less than 2, V(s) may be the same or different when n is not less than 2, $R^3$(s) may be the same or different when N-m-n-1 is not less than 2, and $Z^1$(s) may be the same or different when a plurality of the side chains relative to the main chain are included, with proviso that P (side chain (b)) is needed to be bonded to at least one branching point ($Z^1$) included in the conjugated diene graft polymer of the present invention. The conjugated diene graft polymer here satisfies a relationship of expression (2) described later. The conjugated diene graft polymer of the present invention may have one or more side chains relative to one main chain, and may include $Z^1$ ($Z^1$ in which m is 0) to which no side chain is bonded, and Z1 is also here defined as the branching point.

The branching point has one hetero atom, and the hetero atom is a hetero atom having a valence of not less than 3. The hetero atom having a valence of not less than 3, serving as the branching point, is at least one selected from the group consisting of Si, Sn, Ge, Pb, P, B, and Al. Of these hetero atoms, Si and Sn are preferable, and, Si is more preferable.

In the formulae (III-3) and (III-4), $R^3$ represents a $C_{6-12}$ aryl group, a $C_{1-12}$ alkyl group, or a hydrogen atom. Of these, a $C_{1-6}$ alkyl group is preferable, and a n-butyl group, a sec-butyl group, a n-propyl group, an isopropyl group, an ethyl group, or a methyl group is more preferable. $R^3$ may be one selected from the above group, or may be of two or more kinds selected therefrom. $R^3$ may be represented by one single group, or two or more kinds of groups.

The $C_{1-12}$ alkylene group having a hetero atom, which may be $R^{2b}$, is preferably a $C_{1-12}$ alkylene group having S, and more preferably $SR^{2b'}$ ($R^{2b'}$ represents a $C_{1-12}$ alkylene group).

In the conjugated diene graft polymer of the present invention, at least one group (c) selected from the group consisting of an alkoxy group and a hydroxyl group may be bonded to at least one branching point. Therefore, a group V (functional group (c)) may be contained in the formulae (III-3) and (III-4). Examples of the alkoxy groups include a methoxy group, an ethoxy group, and a propoxy group. The functional group (c) is preferably any of a methoxy group, an ethoxy group, and a hydroxyl group from the point of view of affinity for polar materials. The functional group (c) may be represented by one single group, or two or more kinds of groups.

The conjugated diene graft polymer of the present invention satisfies a relationship of the following expression (2) when there is focused on a hetero atom serving as the branching point in the graft polymer and the valence of the hetero atom is defined as N and the average number of the side chains (b) directly bonded to one branching point is defined as B. Such a relationship is satisfied and thus the branching point is bonded to the main chain (a) directly or through a linking chain and the conjugated diene graft polymer of the present invention includes at least the side chain (b).

$$N-1 \ge B+C, \ B>0 \qquad (2)$$

In the conjugated diene graft polymer of the present invention, at least one functional group (c) selected from the group consisting of an alkoxy group and a hydroxyl group may be bonded to the branching point, as described above. When the average number of the functional groups (c) bonded to one branching point is defined as C, the valence N of the hetero atom and the average number B of the side chains (b) preferably satisfy a relationship of the following expression (2').

$$N-1 \ge B+C, \ B>0, C>0 \qquad (2')$$

In the conjugated diene graft polymer of the present invention, the average number X of the functional groups (c) directly bonded to the branching point per molecule of the conjugated diene graft polymer is preferably not more than 10 and more preferably not more than 5. The X may be 0.

In the present invention, the average number X of the functional groups (c) directly bonded to the branching point per molecule of the conjugated diene graft polymer is determined from the average number of the functional groups (c) per branching point in the conjugated diene graft polymer and the average number Y of branching points per molecule of the conjugated diene graft polymer, by the following expression (6).

(Average number $X$ of functional groups ($c$) directly bonded to branching point per molecule of conjugated diene graft polymer)=(Average number of functional groups ($c$) per branching point in conjugated diene graft polymer)×(Average number $Y$ of branching points per molecule of conjugated diene graft polymer) (6)

The average number of the functional groups (c) per branching point in the conjugated diene graft polymer is determined from the results of $^{29}$Si-NMR measurement of the conjugated diene graft polymer, for example, when Z is Si. Specifically, it is determined by multiplying the number of the functional groups with each of the values of integral with respect to, for example, Si to which one functional group (c) is bonded and Si to which two functional groups (c) are bonded, summing such products, and comparing the resultant with a simple total of the values of integral. Also when Z is a hetero atom other than Si, the average number of the hetero atoms per molecule of the conjugated diene graft polymer may be determined in the same manner.

In the present invention, the average number Y of branching points per molecule of the conjugated diene graft polymer is determined with the content (wt %) of a specific hetero atom (Si, Sn, Ge, Pb, P, B, and Al) in the conjugated diene graft polymer and the number average molecular weight (Mn) measured with an inductively coupled plasma mass spectrometer (ICP-MS) relative to polystyrene standards, by the following expression (7).

(Average number Y of branching points per molecule of conjugated diene graft polymer)=[(Content (wt %) of hetero atom)/100]×[(Number average molecular weight Mn)/(Molecular weight of styrene unit)×(Average molecular weight of units of conjugated diene and optional monomers other than conjugated dienes)]/(Atomic weight of hetero atom)       (7)

If the X exceeds 10, the heat stability and weather resistance of the conjugated diene graft polymer tend to deteriorate.

The X is preferably in the range of not less than 0.01 and not more than 9.9, and more preferably in the range of not less than 0.02 and not more than 9, in order that excellent transparency, heat stability and weather resistance are attained.

The number of the side chains (b) and the number of the functional groups (c), directly bonded to the branching point, may be adjusted in desired ranges by the molar ratio of the active end polymer (I) and the functional group-modified conjugated diene polymer (F) loaded in the step (A-1) in the production of the conjugated diene graft polymer by the production method, the amount of reagents used for use in partial deactivation of at least one remaining functional group selected from the group consisting of an alkoxy group and a hydroxyl group (functional group V present in the form of an unreacted form) are used and the reaction time in the step (A-2), and the type of an optional polar compound and the amount thereof added.

In the conjugated diene graft polymer of the present invention, when the average number of the side chains (b) directly bonded to the branching point per molecule of the conjugated diene graft polymer is defined as W and the average number Y of the branching points per molecule of the conjugated diene graft polymer is defined as Y, (W/Y), namely, the average number of the side chains (b) bonded to one branching point is preferably not less than 0.5, more preferably not less than 0.6, and still more preferably not less than 0.8.

In the present invention, the average number W of the side chains (b) directly bonded to the branching point per molecule of the conjugated diene graft polymer is determined with the amount (molar number) loaded per active end of the active end polymer (I) serving as the side chain (b) in the conjugated diene graft polymer and the amount (molar number) of the functional group-modified conjugated diene polymer (F) loaded, in the step (A-1) in the production method, by the following expression (8).

(Average number $W$ of side chains ($b$) directly bonded to branching point per molecule of conjugated diene graft polymer)=(Amount (molar number) loaded per active end of active end polymer ($I$) serving as side chain ($b$))/(Amount (molar number) of functional group-modified conjugated diene polymer ($F$) loaded)       (8)

If the (W/Y) is not more than 1, the fluidity of the conjugated diene graft polymer tends to deteriorate and the balance between processability and mechanical properties tends to be inferior.

The degree of branching of the conjugated diene graft polymer may be determined from the slope ($\alpha_s$) in the double logarithmic plot of the turning radius (R) to the weight average molecular weight (Mw) of the conjugated diene graft polymer by an absolute method, or the slope ($\alpha\rho$) in the double logarithmic plot of the intrinsic viscosity ($\eta$) to the weight average molecular weight (Mw) of the conjugated diene graft polymer by an absolute method. The random coil chain of a usual straight polymer exhibits a value of about 0.6 to 0.8 with respect to both $\alpha_s$ and $\alpha\eta$, and a value of less than 0.6 indicates the presence of a branched chain. The value of $\alpha_s$ or $\alpha\eta$ of the conjugated diene graft polymer of the present invention is preferably less than 0.6, more preferably not more than 0.55, and still more preferably not more than 0.50. The double logarithmic plot of the weight average molecular weight (Mw) and the turning radius (R) or the intrinsic viscosity ($\eta$) of the conjugated diene graft polymer may be acquired by, for example, the SEC-MALS-VISCO method. The SEC-MALS-VISCO method is one liquid chromatography (SEC) in which a polymer chain is separated depending on the difference in molecular size (hydrodynamic volume), and may be combined with a differential refractometer (RI), a multi-angle light scattering detector (MALS), and a viscosity detector (VISCO) to thereby calculate the turning radius and the intrinsic viscosity with respect to each molecular weight of a polymer solution separated in terms of size by SEC. When the value of $\alpha_s$ or $\alpha\eta$ of the conjugated diene graft polymer of the present invention is in the above range, the fluidity of the conjugated diene graft polymer tends to be enhanced and the balance between processability and mechanical properties tends to be excellent.

In the conjugated diene graft polymer of the present invention, the average number W of the side chains (b) directly bonded to the branching point per molecule of the conjugated diene graft polymer is preferably not less than 1, more preferably not less than 2, and still more preferably not less than 3. The average number W of the side chains (b) is calculated by the aforementioned method. If the average number W of the side chains (b) is less than 1, the fluidity of the conjugated diene graft polymer tends to deteriorate and the balance between processability and mechanical properties tends to be inferior.

The average number W of the side chains (b) may be adjusted in a desired range by the ratio of the amount of the active end polymer (I) loaded and the amount of the functional group-modified conjugated diene polymer (F) loaded in the step (A-1) of the production method. For example, when the (Amount (molar number) of active end polymer (I) loaded)/(Amount (molar number) of functional group-modified conjugated diene polymer (F) loaded) is 4/1, the average number W of the side chains (b) is 4. Herein, the upper limit of W is the number of the functional groups V per molecule of the functional group-modified conjugated diene polymer (F).

A combination of the polymer serving as the main chain (a) and the polymer serving as the side chain (b) in the conjugated diene graft polymer is not particularly limited, and these chains may be the same or different and can be designed for any purpose. The polymer serving as the main chain (a) and the polymer serving as the side chain (b) being different means that at least one selected from the group consisting of the following (i) to (iv) is different.

(i) The molecular weight of the polymer serving as the main chain (a) is different from the molecular weight of the polymer serving as the side chain (b).

(ii) The type or the combination of the types of the monomer units of the polymer serving as the main chain (a) is different from the type or the combination of the types of the monomer units of the polymer serving as the side chain (b).

(iii) When the main chain (a) and the side chain (b) each include the same kind of a monomer unit, the composition ratio of the monomer unit of the polymer serving as the main chain (a) is different from the composition ratio of the monomer unit of the polymer serving as the side chain (b).

(iv) When the main chain (a) and the side chain (b) each include a conjugated diene unit, the vinyl content in the conjugated diene unit of the polymer serving as the main chain (a) is different from the vinyl content in the conjugated diene unit of the polymer serving as the side chain (b).

The conjugated diene graft polymer of the present invention preferably contains at least one monomer unit selected from the group consisting of butadiene and isoprene in an amount of not less than 50 mass % of all the monomer units constituting the polymer. The total content of butadiene and isoprene units is more preferably 60 to 100 mass %, and still more preferably 70 to 100 mass % relative to all the monomer units forming the conjugated diene graft polymer.

In the conjugated diene graft polymer of the present invention, the content of the monomer units other than the butadiene and isoprene units is preferably not more than 50 mass %, more preferably not more than 40 mass %, and still more preferably not more than 30 mass %. For example, when the aromatic vinyl compound unit is within the above range, the processability of the conjugated diene graft polymer of the present invention tends to be enhanced.

The weight average molecular weight (Mw) of the conjugated diene graft polymer of the present invention is preferably not less than 5,000 and not more than 1,000,000, preferably not less than 30,000 and not more than 1,000,000, and more preferably more than 100,000 and not more than 1,000,000. When the Mw of the conjugated diene graft polymer is in the above range, the process flow efficiency tends to be enhanced and good economic efficiency tends to be obtained. The processability of the polymer composition including the conjugated diene graft polymer tends to be enhanced.

The molecular weight distribution (Mw/Mn) of the conjugated diene graft polymer of the present invention is preferably 1.0 to 20.0, more preferably 1.0 to 10.0, still more preferably 1.0 to 5.0, and particularly preferably 1.0 to 2.0. This Mw/Mn is advantageous in that the conjugated diene graft polymer has a small variation in viscosity. In the present invention, Mn represents a number average molecular weight, and Mn represents a number average molecular weight measured by GPC relative to polystyrene standards. The molecular weight distribution (Mw/Mn) means the ratio (Mw/Mn) of the weight average molecular weight (Mw) to the number average molecular weight (Mn) measured by GPC relative to polystyrene standards.

The melt viscosity of the conjugated diene graft polymer of the present invention, measured at 38° C., is preferably 0.1 to 2,000 Pa·s, more preferably 0.1 to 1500 Pa·s, and still more preferably 0.1 to 1000 Pas. When the melt viscosity of the conjugated diene graft polymer is in the above range, the process flow efficiency tends to be enhanced and good economic efficiency tends to be obtained.

The vinyl content in the conjugated diene graft polymer of the present invention is not particularly limited, and is preferably not more than 90 mol %, more preferably not more than 80 mol %, and still more preferably not more than 70 mol %. The vinyl content in the conjugated diene graft polymer is preferably not less than 0.5 mol % and more preferably not less than 1 mol %.

The vinyl content in the conjugated diene graft polymer can be designed for any purpose. For example, when the vinyl content is less than 50 mol %, the glass transition temperature (Tg) of the conjugated diene graft polymer, described later, tends to be lower, and the fluidity and the low-temperature characteristics of the conjugated diene graft polymer tend to be excellent. When the vinyl content is not less than 50 mol %, the reactivity of the conjugated diene graft polymer tends to be excellent.

The glass transition temperature (Tg) of the conjugated diene graft polymer is variable depending on factors such as the vinyl contents in the butadiene units, isoprene units and butadiene units, the vinyl contents in conjugated diene units other than the isoprene units, the type of the conjugated diene unit, and the content of units derived from monomers other than the conjugated dienes, but is preferably −150 to 50° C., more preferably −130 to 50° C., and still more preferably −130 to 30° C. For example, this Tg ensures that the increase in viscosity is suppressed and the polymer can be handled easily.

The mass ratio of the main chain and the side chain in the conjugated diene graft polymer of the present invention is preferably in the range of 10/90 to 90/10, more preferably in the range of 15/85 to 80/20, and still more preferably in the range of 20/80 to 70/30. When the mass ratio of the main chain and the side chain is in the above range, the processability of the polymer composition including the conjugated diene graft polymer tends to be enhanced.

In the conjugated diene graft polymer of the present invention, the catalyst residue content ascribed to the polymerization catalyst used in the rubber production is preferably in the range of 0 to 200 ppm in terms of metal. When, for example, the polymerization catalyst used for the production of the conjugated diene graft polymer is an organoalkali metal such as an organolithium compound as described later, the metal based on which the catalyst residue content is determined is the alkali metal such as lithium. The above catalyst residue content ensures that a decrease in tackiness during processing or the like will be avoided and that the conjugated diene graft polymer of the invention will attain enhancements in heat resistance. The catalyst residue content ascribed to the polymerization catalyst used in the production of the conjugated diene graft polymer is more preferably 0 to 150 ppm, and still more preferably 0 to 100 ppm in terms of metal. The catalyst residue content may be measured with, for example, an inductively coupled plasma mass spectrometer (ICP-MS) or a polarized Zeeman atomic absorption spectrophotometer.

For example, the catalyst residue content in the conjugated diene graft polymer may be controlled to the above specific range by purifying the conjugated diene graft polymer to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content.

In the conjugated diene graft polymer of the present invention, the halogen content is preferably not more than 1000 ppm. When, for example, the functional group-modified conjugated diene polymer (F) used for the production of the conjugated diene graft polymer is a silyl chloride-modified conjugated diene polymer, the halogen as reference is chlorine. When the halogen content is in the above range, transparency, heat resistance and weather resistance tends to be favorable. The halogen content in the conjugated diene graft polymer is more preferably not less than 0 ppm and not more than 1000 ppm, still more preferably not less than 0 ppm and not more than 500 ppm, and particularly preferably not less than 0 ppm and not more than 100 ppm. The halogen content may be measured with, for example, combustion ion chromatography.

For example, the halogen content in the conjugated diene graft polymer may be controlled to the above specific range by using an alkoxysilane modified conjugated diene polymer not generating any halide as a by-product, as the functional group-modified conjugated diene polymer (F) that is a raw material for the production of the conjugated diene graft polymer.

[Polymer Composition]

The polymer composition of the present invention includes the conjugated diene graft polymer of the present invention (hereinafter, also referred to as "conjugated diene graft polymer (α)".). The polymer composition may further include an additional polymer (β) other than the conjugated diene graft polymer (α). The additional polymer (β) may be a thermoplastic polymer (β1) or a curable polymer (β2).

Examples of the thermoplastic polymers (β1) include acrylic resins such as polymethyl methacrylate and (meth) acrylic acid ester polymers or copolymers; olefin resins such as polyethylene, ethylene-vinyl acetate copolymers, polypropylene, polybutene-1, poly-4-methylpentene-1 and polynorbornene; ethylene ionomers; styrene resins such as polystyrene, styrene-maleic anhydride copolymers, high-impact polystyrenes, AS resins, ABS resins, AES resins, AAS resins, ACS resins and MBS resins; styrene-methyl methacrylate copolymers; styrene-methyl methacrylate-maleic anhydride copolymers; polyester resins such as polyethylene terephthalate, polybutylene terephthalate and polylactic acid; polyamides such as nylon 6, nylon 66 and polyamide elastomers; polycarbonates; polyvinyl chlorides; polyvinylidene chlorides; polyvinyl alcohols; ethylene-vinyl alcohol copolymers; polyacetals; polyvinylidene fluorides; polyurethanes; modified polyphenylene ethers; polyphenylene sulfides; silicone rubber-modified resins; acrylic rubbers; silicone rubbers; styrene thermoplastic elastomers such as SEPS, SEBS and SIS; and olefin rubbers such as IR, EPR and EPDM.

Examples of the curable polymers (β2) include epoxy resins, unsaturated polyester resins, epoxy (meth)acrylate resins, ester (meth)acrylate resins, phenolic resins, urea resins, melamine resins, thermosetting urethane resins, silicon resins, imide resins, furan resins, alkyd resins, allyl resins, and diallyl phthalate resins. Of these, from the point of view of availability and basic properties of a cured product, and from the point of view of obtaining a polymer composition which is more excellent in bubble releasability and which allows the obtainable cured product to be more excellent in toughness, epoxy resins, unsaturated polyester resins and epoxy (meth)acrylate resins are preferable, and of these, epoxy resins and unsaturated polyester resins are more preferable and epoxy resins are still more preferable. The curable polymers (β2) may be used singly, or two or more may be used in combination.

When the polymer composition includes the conjugated diene graft polymer (α) and the additional polymer (β), the mass ratio of the conjugated diene graft polymer (α) and the additional polymer (β), (α)/(β), is preferably 1/99 to 99/1.

Various additives may be added to the polymer composition of the present invention as long as the effects of the present invention are not impaired. When, for example, the additional polymer (β) is the thermoplastic polymer (β1), such an additive which may be used is, for example, a reinforcing agent or filling agent, such as calcium carbonate, silica, carbon black, glass fiber or clay, or a plasticizer such as process oil, polyethylene glycol, glycerin or phthalic acid ester. Examples of other additives include heat stabilizers, oxidation inhibitors, UV absorbers, colorants, pigments, lubricants, and surfactants. Examples of such additives include foaming agents, and a foamed product may be produced from a polymer composition including a foaming agent and the thermoplastic polymer (β1).

When, for example, the additional polymer (β) is the curable polymer (β2), such an additive is, for example, a curing agent, a curing accelerator, a known rubber, a thermoplastic elastomer, an impact modifier such as core-shell particles, a filling agent (inorganic particles of silica, talc, calcium carbonate, aluminum hydroxide, or the like), a flame retardant, a defoaming agent, a pigment, a dye, an oxidation inhibitor, a weather proofer, a lubricant, or a release agent.

The polymer composition of the present invention may be prepared by a usual mixing method of polymer substances depending on, for example, the composition ratio of components such as the conjugated diene graft polymer (α) and the additional polymer (β).

When the additional polymer (β) is the thermoplastic polymer (β1), the polymer composition may be produced by, for example, a mixing apparatus such as an extruder, a mixing roll, a Banbury mixer or a kneader. In particular, in the present invention, a melt kneading method with such a mixing apparatus is preferable.

When the additional polymer (β) is the curable polymer (β2), the polymer composition may be produced by, for example, sufficient mixing with a mixer or the like and then melt kneading with a mixing roll, an extruder or the like, and thereafter cooling and crushing.

The polymer composition of the present invention may be formed into a molded product by any of various conventionally known molding methods.

When the additional polymer (β) is the thermoplastic polymer (β1), a molded product may be produced by molding the polymer composition by, for example, extrusion, injection molding, hollow molding, compression molding, vacuum molding, or calendaring. Such a procedure provides variously shaped molded product, sheet, film, and the like. A molded product in the form of a non-woven cloth or a fibrous product may also be produced by a method such as a melt blowing method or a spun bonding method.

When the additional polymer (β) is the curable polymer (β2), a molded product may be produced by, for example, curing the polymer composition with heat by a transfer molding method. When the polymer composition includes the curable polymer (β2), other molding methods are, for example, an injection molding method and a compression molding method.

When the additional polymer (β) is the thermoplastic polymer (β1), use applications of a molded product obtained from the polymer composition are, for example, interior and exterior components for automobiles, such as bumpers and instrument panels, housing materials for home electrical appliances such as televisions, stereos and vacuum cleaners, electric and electronic components such as connectors, materials for wire cables, food packaging materials or food containers such as trays for meat and fresh fish, fruit and vegetable packages and containers for frozen foods, packaging materials such as industrial materials, sports products such as sports shoes materials, cloth or leather products, toys, everyday sundries such as sandals, lamination materials for various films, sheets and molded products, pressure-sensitive adhesives/adhesives, stretching materials for use in paper diapers and the like, various rubber products such as hoses, tubes and belts, and medical products.

When the additional polymer (β) is the curable polymer (β2), use applications of the polymer composition, a cured product thereof, or a cured product of a molded product thereof are, for example, various adhesives such as adhesives for fiber reinforcement composite materials (adhesives for fiber reinforcement composite materials for concrete, adhesives for fiber reinforcement composite materials for carriage/transport apparatuses such as automobiles, railway vehicles and airplanes, adhesives for fiber reinforcement composite materials for various sports products, and the like) and adhesives for assembling (adhesives for assembling of components of carriage/transport apparatuses such as automobiles, railway vehicles and airplanes, and the like); various coating materials such as corrosion proof/water proof coating materials for water and sewerage, and corrosion proof coating materials for metals; various paint primers such as paint primers for building and civil engineering, and paint primers for carriage/transport apparatuses such as automobiles, railway vehicles and airplanes; various lining materials such as lining materials for metals, lining materials for concrete, and lining materials for tanks; various repairing materials such as crack repairing materials for concrete; and various electric and electronic components such as printed circuit boards, insulation boards, semiconductor sealing materials and packaging materials.

EXAMPLES

The present invention will be described in further detail by presenting Examples hereinbelow without limiting the scope of the invention to such Examples. The properties of the conjugated diene graft polymer were evaluated by the following methods in Examples and Comparative Examples below.

(1) Weight Average Molecular Weight (Mw), Number Average Molecular Weight (Mn), and Molecular Weight Distribution (Mw/Mn)

The weight average molecular weights (Mw), number average molecular weights (Mn) and molecular weight distributions (Mw/Mn) of the conjugated diene graft polymer and the polymer at each stage of the production thereof were determined by gel permeation chromatography (GPC) relative to polystyrene standards.
Apparatus: GPC apparatus "HLC-8220" manufactured by TOSOH CORPORATION
Separation column: "TSKgel Super Multipore HZ-M (column diameter=4.6 mm, column length=15 cm)" (two columns connected in series and used) manufactured by TOSOH CORPORATION
Eluent: tetrahydrofuran
Eluent flow rate: 0.35 mL/min
Column temperature: 40° C.
Detection method: differential refractive index (RI)
Amount of injection: 10 μl
Concentration: 1 mg/1 cc (conjugated diene graft polymer/THF)

(2) Vinyl Content and Styrene Unit Content

The vinyl contents and the styrene unit contents of the conjugated diene graft polymer and the polymer at each stage of the production thereof were measured with $^1$H-NMR. With respect to the spectrum obtained, the vinyl content was calculated from the ratio of the area of the double-bond peak assigned to the vinylated conjugated diene unit to the area of the double-bond peak assigned to the non-vinylated conjugated diene unit, and the styrene unit content was calculated from the ratio of the area of the aromatic ring peak assigned to the styrene unit to the area of the double-bond peak assigned to the conjugated diene unit.
Apparatus: nuclear magnetic resonance apparatus "JNM-ECX400" manufactured by JEOL Ltd.
Solvent: deuterated chloroform
Measurement temperature: 50° C.
Number of scans: 1024

(3) Average Number Y of Si Atoms (Branching Points) Per Molecule of Polymer

The average number Y of Si atoms (branching points) per each molecule of the conjugated diene graft polymer and the functional group-modified conjugated diene polymer (F) was determined with the Si content (mass %) and the number average molecular weight (Mn) of each of the polymers measured by an inductively coupled plasma mass spectrometer (ICP-MS) relative to polystyrene standards, by the following expression.

(Average number of Si atoms per molecule of polymer)=[(Si content (mass %))/100]×[(Number average molecular weight Mn)/(Molecular weight of styrene unit)×(Average molecular weight of units of conjugated diene and optional monomers other than conjugated dienes)]/Atomic weight of Si atom The average number Y of B atoms (branching points) per molecule of each of the polymers was determined by the same procedure in Example 15.

(4) Average Number W of Side Chains (b) Per Molecule of Conjugated Diene Graft Polymer The average number W of the side chains (b) per molecule of the conjugated diene graft polymer was determined with the amount (molar number) loaded per active end of the active end polymer (I) serving as a component of the side chain (b) in the conjugated diene graft polymer and the amount (molar number) of the functional group-modified conjugated diene polymer (F) loaded in the above coupling step, by the following expression.

(Average number W of side chains (b) per molecule of conjugated diene graft polymer)=(Amount (molar number) loaded per active end of active end polymer (I) serving as component of side chain (b))/Amount (molar number) of (functional group-modified conjugated diene polymer (F) loaded)

(5) Average Number (W/Y) of Side Chains (b) to One Si Atom (Branching Point) in Conjugated Diene Graft Polymer The average number (W/Y) of the side chains (b) to one Si atom (branching point) in the conjugated diene graft polymer was determined with the average number W of the side chains (b) per molecule of the conjugated diene graft polymer and the average number Y of Si atoms per molecule of the conjugated diene graft polymer, by the following expression.

(Average number (W/Y) of side chains (b) per Si atom in conjugated diene graft polymer)=(Average number W of side chains (b) per molecule of conjugated diene graft polymer)/(Average number Y of Si atoms per molecule of conjugated diene graft polymer)

The average number (W/Y) of the side chains (b) per B atom (branching point) in the conjugated diene graft polymer was determined with the average number W of the side chains (b) per molecule of the conjugated diene graft polymer and the average number Y of B atoms per molecule of the conjugated diene graft polymer in Example 15.

(6) Rate of Coupling

The rate of coupling of the conjugated diene graft polymer is determined with the area of the peak assigned to an unreacted polymer component in coupling and the sum of the areas of all the peaks obtained in GPC measurement, by the following expression.

(Rate of coupling (%))=[{(Sum of areas of all peaks)−(Peak area of component derived from active end polymer (I))}/(Sum of areas of all peaks)]×100

(7) Content of Chlorine

The content of chlorine in the conjugated diene graft polymer was determined by automated combustion ion chromatography.

<Combustion Apparatus>
Apparatus: automated sample combustion apparatus "AQF-2100H" manufactured by Mitsubishi Chemical Analytech Co., Ltd.
Combustion temperature: 1000° C.
Absorption liquid: ion-exchange water <Ion Chromatography>
Apparatus: ion chromatograph "ICS-2100" manufactured by Thermo Fisher Scientific
Separation column: "IonPac AS20" manufactured by Thermo Fisher Scientific
Eluent: aqueous KOH solution
Column temperature: 40° C.

(8) Transparency

The transparency of the conjugated diene graft polymer was evaluated in terms of cloudiness (HAZE). The conjugated diene graft polymer was dissolved in cyclohexane so that the concentration of the polymer was 30 wt %, and the cloudiness (HAZE) was measured using a cell for liquids, having an optical path length of 10 mm, with a haze mater "SH7000" manufactured by Nippon Denshoku Industries Co., Ltd. and the transparency was evaluated according to the following indexes.

A: cloudiness (HAZE) of less than 80%
B: cloudiness (HAZE) of not less than 80%

(9) Heat Resistance

The heat stability of the conjugated diene graft polymer was visually evaluated based on the change in appearance during heating. The heat resistance was evaluated according to the following indexes by coating a glass slide with the conjugated diene graft polymer, heating the resultant in the air at 120° C. or 100° C. for 12 hours and then observing the appearance after the heating.

A: no change in appearance
B: gelling or yellowing

Example 1

(Step (1))

A thoroughly dried 5 L autoclave was purged with nitrogen and loaded with 1580 g of cyclohexane and 56 g of sec-butyllithium (a 10.5 mass % cyclohexane solution). After the temperature had been increased to 50° C., 2.9 g of tetrahydrofuran and 1250 g of butadiene were added stepwise while performing stirring and while controlling the polymerization temperature at 50° C. Under such conditions, the polymerization was performed for 1 hour. The polymerization reaction was terminated by the addition of 3.3 g of methanol. A polymer solution was thus obtained.

Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified conjugated diene polymer (F'-1).

(Step (2))

Subsequently, a 1 L-volume autoclave was loaded with 700 g of the unmodified conjugated diene polymer (F'-1) obtained in the step (1), and the system was deaerated with nitrogen while performing stirring at 60° C. for 3 hours. There were added 0.9 g of t-butyl peroxypivalate and 51 g of 3-mercaptopropyltriethoxysilane. The reaction was performed at 80° C. for 8 hours. A functional group-modified conjugated diene polymer (F-1) was thus obtained. The functional group-modified conjugated diene polymer (F-1) obtained is analyzed and thus the weight average molecular weight of a main chain (a) of a conjugated diene graft polymer (G-1) described later, and the vinyl content and the styrene unit content in the polymer can be determined. In the functional group-modified conjugated diene polymer (F-1) obtained, the weight average molecular weight was 26,000, the vinyl content was 30 mol %, the styrene unit content was 0 mass %, and the average number of Si atoms per molecule of the polymer was 4. The functional group-modified conjugated diene polymer (F-1) obtained was diluted by the addition of 1750 g of cyclohexane so that the concentration was 30 mass %. A diluted solution of the functional group-modified conjugated diene polymer (F-1), for use in a coupling reaction described later, was thus obtained.

(Step (3))

A thoroughly dried 5 L autoclave was purged with nitrogen and loaded with 700 g of cyclohexane and 78 g of sec-butyllithium (a 10.5 mass % cyclohexane solution). After the temperature had been increased to 50° C., 340 g of butadiene was added stepwise while performing stirring and while controlling the polymerization temperature at 50° C. Under such conditions, the polymerization was performed for 1 hour. An active end polymer (I-1) was thus obtained. The polymer solution in the step (3) is sampled and analyzed, and thus the weight average molecular weight of a side chain (b) of a conjugated diene graft polymer (G-1) described later, and the vinyl content and the styrene unit content in the polymer can be determined. In the active end polymer (I-1) obtained, the weight average molecular weight was 5,000, the vinyl content was 10 mol %, and the styrene unit content was 0 mass %.

(Step (4))

Subsequently, 7.0 g of tetrahydrofuran and 1480 g of the diluted solution of the functional group-modified conjugated diene polymer (F-1) obtained in the step (2) were added to a solution including the active end polymer (I-1) obtained in the step (3), and the coupling reaction was performed at 50° C. for 2 hours. Thereafter, 190 g of sec-butyllithium (a 10.5 mass % cyclohexane solution) was added and the reaction was performed for 6 hours, to deactivate some of the remaining alkoxy groups. The polymerization reaction was terminated by the addition of 21 g of methanol. A polymer solution was thus obtained.

(Step (5))

Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a conjugated diene graft polymer (G-1). In the conjugated diene graft polymer (G-1) obtained, the weight average molecular weight was 46,000, the Mw/Mn was 1.5, the styrene unit content was 0 mass %, the rate of coupling was 95%, the average number of Si atoms (branching points) per molecule of the polymer was 4, the average number of the side chains (b) per molecule of the polymer was 4, the average number of the side chains (b) per Si atom (branching point) was 1, and the content of chlorine was 3 ppm. The type and the amount of each reagent used in Example 1 are described in Table 1. The molecular specification and properties of the conjugated diene graft polymer (G-1) obtained are described in Table 3.

Examples 2 to 13

Conjugated diene graft polymers (G-2) to (G-13) were each obtained by the same method as in Example 1 except that the type and the amount of each reagent used in the steps (1) to (6) were changed as described in Tables 1 and 2. The molecular specifications and properties of the conjugated diene graft polymers (G-2) to (G-13) obtained are described in Tables 3 and 4.

Example 14

(Step (1))
A thoroughly dried 5 L autoclave was purged with nitrogen and loaded with 1580 g of cyclohexane and 56 g of sec-butyllithium (a 10.5 mass % cyclohexane solution). After the temperature had been increased to 50° C., 2.9 g of tetrahydrofuran and 1250 g of butadiene were added stepwise while performing stirring and while controlling the polymerization temperature at 50° C. Under such conditions, the polymerization was performed for 1 hour. The polymerization reaction was terminated by the addition of 3.3 g of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified conjugated diene polymer (F'-14).

(Step (2))
Subsequently, a 5 L separable flask equipped with a stirrer, a reflux condenser, a dropping funnel and a thermometer was loaded with 700 g of the unmodified conjugated diene polymer (F'-14) obtained in the step (1), 1400 g of toluene, a toluene solution of a platinum-1,3-divinyl-1,1,3,3-tetramethyldisiloxane complex ($2.1 \times 10^{-5}$ mol in terms of platinum atom), and 0.12 g of acetic acid. There was dropped 34 g of triethoxysilane at an internal temperature of 75 to 85° C. over 2 hours, and the resulting mixture was stirred at 80° C. for 1 hour. After the completion of the stirring, a functional group-modified conjugated diene polymer (F-14) was obtained by concentration under reduced pressure and filtration. The functional group-modified conjugated diene polymer (F-14) obtained is analyzed and thus the weight average molecular weight of a main chain (a) of a conjugated diene graft polymer (G-14) described later, and the vinyl content and the styrene unit content in the chain can be determined. In the functional group-modified conjugated diene polymer (F-14) obtained, the weight average molecular weight was 26,000, the vinyl content was 30 mol %, the styrene unit content was 0 mass %, and the average number of Si atoms per molecule of the polymer was 4. The functional group-modified conjugated diene polymer (F-14) obtained was diluted by the addition of 1710 g of cyclohexane so that the concentration was 30 mass %. A diluted solution of the functional group-modified conjugated diene polymer (F-14), for use in a coupling reaction described later, was thus obtained.

(Step (3))
A thoroughly dried 5 L autoclave was purged with nitrogen and loaded with 700 g of cyclohexane and 78 g of sec-butyllithium (a 10.5 mass % cyclohexane solution). After the temperature had been increased to 50° C., 340 g of butadiene was added stepwise while performing stirring and while controlling the polymerization temperature at 50° C. Under such conditions, the polymerization was performed for 1 hour. An active end polymer (I-14) was thus obtained. The polymer solution in the step (3) is sampled and analyzed, and thus the weight average molecular weight of a side chain (b) of a conjugated diene graft polymer (G-14) described later, and the vinyl content and the styrene unit content in the chain can be determined. In the active end polymer (I-14) obtained, the weight average molecular weight was 5,000, the vinyl content was 10 mol %, and the styrene unit content was 0 mass %.

(Step (4))
Subsequently, 7.0 g of tetrahydrofuran and 1480 g of the diluted solution of the functional group-modified conjugated diene polymer (F-14) obtained in the step (2) were added to a solution including the active end polymer (I-14) obtained in the step (3), and the coupling reaction was performed at 50° C. for 2 hours. Thereafter, 195 g of sec-butyllithium (a 10.5 mass % cyclohexane solution) was added and the reaction was performed for 6 hours, to deactivate some of the remaining alkoxy groups. The polymerization reaction was terminated by the addition of 21 g of methanol. A polymer solution was thus obtained.

(Step (5))
Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a conjugated diene graft polymer (G-14). In the conjugated diene graft polymer (G-14) obtained, the weight average molecular weight was 46,000, the Mw/Mn was 1.5, the styrene unit content was 0 mass %, the rate of coupling was 95%, the average number of Si atoms (branching points) per molecule of the polymer was 4, the average number of the side chains (b) per molecule of the polymer was 4, the average number of the side chains (b) per Si atom (branching point) was 1, and the content of chlorine was 3 ppm. The molecular specification and properties of the conjugated diene graft polymer (G-14) obtained are described in Table 4.

Example 15

(Step (1))
A thoroughly dried 5 L autoclave was purged with nitrogen and was loaded with 1580 g of cyclohexane and 56 g of sec-butyllithium (a 10.5 mass % cyclohexane solution). After the temperature had been increased to 50° C., 2.9 g of tetrahydrofuran and 1250 g of butadiene were added stepwise while performing stirring and while controlling the polymerization temperature at 50° C. Under such conditions, the polymerization was performed for 1 hour. The polymerization reaction was terminated by the addition of 3.3 g of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified conjugated diene polymer (F'-15).

(Step (2))

Subsequently, a 5 L separable flask equipped with a stirrer, a reflux condenser, a dropping funnel and a thermometer was loaded with 700 g of the unmodified conjugated diene polymer (F'-15) obtained in the step (1) and 1400 g of cyclohexane, and was purged with nitrogen. There were added 22 g of trimethyl borate and 1.8 g of triethylamine borane. The reaction was performed at 80° C. for 10 hours reaction. After the completion of the reaction, a functional group-modified conjugated diene polymer (F-15) was obtained by concentration under reduced pressure and filtration. The functional group-modified conjugated diene polymer (F-15) obtained is analyzed and thus the weight average molecular weight of a main chain (a) of a conjugated diene graft polymer (G-15) described later, and the vinyl content and the styrene unit content in the chain can be determined. In the functional group-modified conjugated diene polymer (F-15) obtained, the weight average molecular weight was 26,000, the vinyl content was 30 mol %, the styrene unit content was 0 mass %, and the average number of B atoms per molecule of the polymer was 4. The functional group-modified conjugated diene polymer (F-15) obtained was diluted by the addition of 1680 g of cyclohexane so that the concentration was 30 mass %. A diluted solution of the functional group-modified conjugated diene polymer (F-15), for use in a coupling reaction described later, was thus obtained.

(Step (3))

A thoroughly dried 5 L autoclave was purged with nitrogen and loaded with 700 g of cyclohexane and 78 g of sec-butyllithium (a 10.5 mass % cyclohexane solution). After the temperature had been increased to 50° C., 340 g of butadiene was added stepwise while performing stirring and while controlling the polymerization temperature at 50° C. Under such conditions, the polymerization was performed for 1 hour. An active end polymer (I-15) was thus obtained. The polymer solution in the step (3) is sampled and analyzed, and thus the weight average molecular weight of a side chain (b) of a conjugated diene graft polymer (G-15) described later, and the vinyl content and the styrene unit content in the chain can be determined. In the active end polymer (I-15) obtained, the weight average molecular weight was 5,000, the vinyl content was 10 mol %, and the styrene unit content was 0 mass %.

(Step (4))

Subsequently, 7.0 g of tetrahydrofuran and 1480 g of the diluted solution of the functional group-modified conjugated diene polymer (F-15) obtained in the step (2) were added to a solution including the active end polymer (I-15) obtained in the step (3), and the coupling reaction was performed at 50° C. for 2 hours. Thereafter, 195 g of sec-butyllithium (a 10.5 mass % cyclohexane solution) was added and the reaction was performed for 6 hours, to deactivate some of the remaining alkoxy groups. The polymerization reaction was terminated by the addition of 21 g of methanol. A polymer solution was thus obtained.

(Step (5))

Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a conjugated diene graft polymer (G-15). In the conjugated diene graft polymer (G-15) obtained, the weight average molecular weight was 46,000, the Mw/Mn was 1.5, the styrene unit content was 0 mass %, the rate of coupling was 95%, the average number of B atoms (branching points) per molecule of the polymer was 4, the average number of the side chains (b) per molecule of the polymer was 4, the average number of the side chains (b) per B atom (branching point) was 1, and the content of chlorine was 3 ppm. The molecular specification and properties of the conjugated diene graft polymer (G-15) obtained are described in Table 4.

Example 16

A conjugated diene graft polymer (G-16) was obtained by adding Lithium chloride to the conjugated diene graft polymer (G-1) obtained in Example 1 so that the content of chlorine was 50 ppm, and kneading the resulting mixture. The molecular specification and properties of the conjugated diene graft polymer (G-16) obtained are described in Table 4.

Example 17

A conjugated diene graft polymer (G-17) was obtained by adding Lithium chloride to the conjugated diene graft polymer (G-1) obtained in Example 1 so that the content of chlorine was 500 ppm, and kneading the resulting mixture. The molecular specification and properties of the conjugated diene graft polymer (G-17) obtained are described in Table 4.

Comparative Example 1

(Step (1))

A thoroughly dried 5 L autoclave was purged with nitrogen and loaded with 1580 g of cyclohexane and 56 g of sec-butyllithium (a 10.5 mass % cyclohexane solution). After the temperature had been increased to 50° C., 2.9 g of tetrahydrofuran and 1250 g of butadiene were added stepwise while performing stirring and while controlling the polymerization temperature at 50° C. Under such conditions, the polymerization was performed for 1 hour. The polymerization reaction was terminated by the addition of 3.3 g of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified conjugated diene polymer (F'-18).

(Step (2))

Subsequently, a 5 L separable flask equipped with a stirrer, a reflux condenser, a dropping funnel and a thermometer was loaded with 700 g of the unmodified conjugated diene polymer (F'-18) obtained in the step (1), 1400 g of cyclohexane, 5.6 mL of a 2% xylene solution of a platinum-1,3-divinyl-1,1,3,3-tetramethyldisiloxane complex ("PC072" manufactured by Petrarch Systems Inc.), and 120 g of trimethylchlorosilane, and the resulting mixture was stirred overnight. Thereafter, 20 g of dimethylchlorosilane was dropped thereinto. Thereafter, the resulting mixture was gradually heated until the internal temperature reached 70° C., and stirred under reflux for 24 hours with the internal temperature being kept at 70° C. After the completion of the stirring, a functional group-modified conjugated diene polymer (F-18) was obtained by concentration under reduced pressure and filtration. The functional group-modified conjugated diene polymer (F-18) obtained is analyzed and thus the weight average molecular weight of a main chain (a) of a conjugated diene graft polymer (G-18) described later, and the vinyl content and the styrene unit content in the chain can be determined. In the functional group-modified conjugated diene polymer (F-18) obtained, the weight average molecular weight was 26,000, the vinyl content was 30 mol %, the styrene unit content was 0 mass %, and the average number of Si atoms per molecule of the polymer was 4. The functional group-modified conjugated diene polymer (F-18) obtained was diluted by the addition of 1680 g of cyclohexane so that the concentration was 30 mass %. A diluted solution of the functional group-modified conjugated diene polymer (F-18), for use in a coupling reaction described later, was thus obtained.

(Step (3))

A thoroughly dried 5 L autoclave was purged with nitrogen and loaded with 700 g of cyclohexane and 78 g of sec-butyllithium (a 10.5 mass % cyclohexane solution). After the temperature had been increased to 50° C., 340 g of butadiene was added stepwise while performing stirring and while controlling the polymerization temperature at 50° C. Under such conditions, the polymerization was performed for 1 hour. An active end polymer (I-18) was thus obtained. The polymer solution in the step (3) is sampled and analyzed, and thus the weight average molecular weight of a side chain (b) of a conjugated diene graft polymer (G-18) described later, and the vinyl content and the styrene unit content in the chain can be determined. In the active end polymer (I-18) obtained, the weight average molecular weight was 5,000, the vinyl content was 10 mol %, and the styrene unit content was 0 mass %.

(Step (4))

Subsequently, 7.0 g of tetrahydrofuran and 1480 g of the diluted solution of the functional group-modified conjugated diene polymer (F-18) obtained in the step (2) were added to a solution including the active end polymer (I-18) obtained in the step (3), and the coupling reaction was performed at 50° C. for 2 hours. Thereafter, 195 g of sec-butyllithium (a 10.5 mass % cyclohexane solution) was added and the reaction was performed for 6 hours reaction. The polymerization reaction was terminated by the addition of 21 g of methanol. A polymer solution was thus obtained.

(Step (5))

Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a conjugated diene graft polymer (G-18). In the conjugated diene graft polymer (G-18) obtained, the weight average molecular weight was 46,000, the Mw/Mn was 1.5, the styrene unit content was 0 mass %, the rate of coupling was 99%, the average number of Si atoms (branching points) per molecule of the polymer was 4, the average number of the side chains (b) per molecule of the polymer was 4, the average number of the side chains (b) per Si atom (branching point) was 1, and the content of chlorine was 7,000 ppm. The molecular specification and properties of the conjugated diene graft polymer (G-18) obtained are described in Table 4.

Comparative Example 2

(Step (1))

A thoroughly dried 5 L autoclave was purged with nitrogen and loaded with 1580 g of cyclohexane and 13 g of sec-butyllithium (a 10.5 mass % cyclohexane solution). After the temperature had been increased to 50° C., 2.8 g of tetrahydrofuran and 1170 g of butadiene were added stepwise while performing stirring and while controlling the polymerization temperature at 50° C. Under such conditions, the polymerization was performed for 1 hour. The polymerization reaction was terminated by the addition of 0.8 g of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified conjugated diene polymer (F'-19).

(Step (2))

Subsequently, a 5 L separable flask equipped with a stirrer, a reflux condenser, a dropping funnel and a thermometer was loaded with 700 g of the unmodified conjugated diene polymer (F'-19) obtained in the step (1), 1400 g of cyclohexane, 5.6 mL of a 2% xylene solution of a platinum-1,3-divinyl-1,1,3,3-tetramethyldisiloxane complex ("PC072" manufactured by Petrarch Systems Inc.), and 120 g of trimethylchlorosilane, and the resulting mixture was stirred overnight. Thereafter, 5.1 g of dimethylchlorosilane was dropped thereinto. Thereafter, the resulting mixture was gradually heated until the internal temperature reached 70° C., and stirred under reflux for 24 hours with the internal temperature being kept at 70° C. After the completion of the stirring, a functional group-modified conjugated diene polymer (F-19) was obtained by concentration under reduced pressure and filtration. The functional group-modified conjugated diene polymer (F-19) obtained is analyzed and thus the weight average molecular weight of a main chain (a) of a conjugated diene graft polymer (G-19) described later, and the vinyl content and the styrene unit content in the chain can be determined. In the functional group-modified conjugated diene polymer (F-19) obtained, the weight average molecular weight was 100,000, the vinyl content was 30 mol %, the styrene unit content was 0 mass %, and the average number of Si atoms per molecule of the polymer was 4. The functional group-modified conjugated diene polymer (F-19) obtained was diluted by the addition of 1650 g of cyclohexane so that the concentration was 30 mass %. A diluted solution of the functional group-modified conjugated diene polymer (F-19), for use in a coupling reaction described later, was thus obtained.

(Step (3))

A thoroughly dried 5 L autoclave was purged with nitrogen and loaded with 850 g of cyclohexane and 8.7 g of sec-butyllithium (a 10.5 mass % cyclohexane solution). After the temperature had been increased to 50° C., 150 g of butadiene was added stepwise while performing stirring and while controlling the polymerization temperature at 50° C. Under such conditions, the polymerization was performed for 1 hour. An active end polymer (I-19) was thus obtained. The polymer solution in the step (3) is sampled and analyzed, and thus the weight average molecular weight of a side chain (b) of a conjugated diene graft polymer (G-19) described later, and the vinyl content and the styrene unit content in the chain can be determined. In the active end polymer (I-19) obtained, the weight average molecular weight was 20,000, the vinyl content was 10 mol %, and the styrene unit content was 0 mass %.

(Step (4))

Subsequently, 7.8 g of tetrahydrofuran and 1460 g of the diluted solution of the functional group-modified conjugated diene polymer (F-19) obtained in the step (2) were added to a solution including the active end polymer (I-19) obtained in the step (3), and the coupling reaction was performed at 50° C. for 2 hours. Thereafter, 54 g of sec-butyllithium (a 10.5 mass % cyclohexane solution) was added and the reaction was performed for 6 hours. Thereafter, the polymerization reaction was terminated by the addition of 4.8 g of methanol. A polymer solution was thus obtained.

(Step (5))

Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a conjugated diene graft polymer (G-19). In the conjugated diene graft polymer (G-19) obtained, the weight average molecular weight was 180,000, the Mw/Mn was 1.5, the styrene unit content was 0 mass %, the rate of coupling was 99%, the average number of Si atoms (branching points) per molecule of the polymer was 4, the average number of the side chains (b) per molecule of the polymer was 4, the average number of the side chains (b) per Si atom (branching point) was 1, and the content of chlorine was 1,500 ppm. The molecular specification and properties of the conjugated diene graft polymer (G-19) obtained are described in Table 4.

The type and the amount of each reagent used in the steps (1) to (5) in Examples 1 to 13 are described in Tables 1 and 2 below, and the properties of the conjugated diene graft polymers obtained in Examples 1 to 17 and Comparative Examples 1 and 2 are described in Tables 3 and 4.

TABLE 1

| | | | | Example 1 | Example 2 | Example 3 | Example 4 | Example 5 | Example 6 | Example 7 |
|---|---|---|---|---|---|---|---|---|---|---|
| Step (1) | Solvent | Cyclohexane | g | 1580 | 1580 | 1580 | 1580 | 1580 | 1580 | 1580 |
| | Anionic initiator | SBL | g | 56 | 56 | 56 | 56 | 56 | 56 | 18 |
| | Polar compound | THF | g | 2.9 | 11.3 | 11.3 | 0 | 0 | 0 | 2.8 |
| | Monomer | | | Bd | Bd | Bd | Bd | Bd | Bd | Bd |
| | | | g | 1250 | 1250 | 1250 | 1250 | 1250 | 1250 | 1220 |
| | Terminator | Methanol | g | 3.3 | 3.3 | 3.3 | 3.3 | 3.3 | 3.3 | 1.1 |
| | Unmodified conjugated diene polymer | | | (F'-1) | (F'-2) | (F'-3) | (F'-4) | (F'-5) | (F'-6) | (F'-7) |
| Step (2) | Unmodified conjugated diene polymer | | | (F'-1) | (F'-2) | (F'-3) | (F'-4) | (F'-5) | (F'-6) | (F'-7) |
| | | | g | 700 | 700 | 700 | 700 | 700 | 700 | 700 |
| | Radical generator | t-BPOP | g | 0.9 | 0.9 | 0.9 | 0.9 | 0.9 | 0.9 | 0.9 |
| | Silane compound | | | MPTES | MPTES | MPTES | MPTES | MPTES | MPTES | MPTES |
| | | | g | 51 | 51 | 51 | 51 | 51 | 51 | 17 |
| | Functional group-modified conjugated diene polymer | | | (F-1) | (F-2) | (F-3) | (F-4) | (F-5) | (F-6) | (F-7) |
| | Dilution solvent | Cyclohexane | g | 1750 | 1750 | 1750 | 1750 | 1750 | 1750 | 1670 |
| Step (3) | Solvent | Cyclohexane | g | 700 | 700 | 700 | 700 | 700 | 700 | 340 |
| | Anionic initiator | SBL | g | 78 | 78 | 78 | 78 | 78 | 78 | 37 |
| | Polar compound | THF | g | 0 | 0 | 7.0 | 7.0 | 4.3 | 0 | 0 |
| | Monomer | | | Bd | Bd | Bd | Bd | Bd | Bd | Bd |
| | | | g | 340 | 340 | 340 | 340 | 340 | 340 | 160 |
| | Active end polymer | | | (I-1) | (I-2) | (I-3) | (I-4) | (I-5) | (I-6) | (I-7) |
| Step (4) | Lewis base | THF | g | 7.0 | 7.0 | 0 | 0 | 0 | 7.0 | 3.4 |
| | Diluted solution of functional group-modified conjugated diene polymer | | | (F-1) | (F-2) | (F-3) | (F-4) | (F-5) | (F-6) | (F-7) |
| | | | g | 1480 | 1480 | 1480 | 1480 | 1480 | 1480 | 1970 |
| | Deactivation reagent | SBL | g | 190 | 190 | 190 | 190 | 190 | 190 | 94 |
| | Terminator | Methanol | g | 21 | 21 | 21 | 21 | 21 | 21 | 10 |
| Step (5) | Conjugated diene graft polymer | | | (G-1) | (G-2) | (G-3) | (G-4) | (G-5) | (G-6) | (G-7) |

TABLE 2

| | | | | Example 8 | Example 9 | Example 10 | Example 11 | Example 12 | Example 13 |
|---|---|---|---|---|---|---|---|---|---|
| Step (1) | Solvent | Cyclohexane | g | 1580 | 1580 | 1580 | 1580 | 1580 | 1580 |
| | Anionic initiator | SBL | g | 56 | 56 | 56 | 56 | 56 | 56 |
| | Polar compound | THF | g | 2.9 | 2.9 | 2.9 | 2.9 | 11.3 | 2.9 |
| | Monomer | | | Bd | Bd | Bd | Bd/Ip = 50/50(wt) | Bd | Bd |
| | | | g | 1250 | 1250 | 1250 | 1410 | 1250 | 1250 |
| | Terminator | Methanol | g | 3.3 | 3.3 | 3.3 | 3.3 | 3.3 | 3.3 |
| | Unmodified conjugated diene polymer | | | (F'-8) | (F'-9) | (F'-10) | (F'-11) | (F'-12) | (F'-13) |

TABLE 2-continued

| | | | Example 8 | Example 9 | Example 10 | Example 11 | Example 12 | Example 13 |
|---|---|---|---|---|---|---|---|---|
| Step (2) | Unmodified conjugated diene polymer | g | (F'-8) 700 | (F'-9) 700 | (F'-10) 700 | (F'-11) 700 | (F'-12) 700 | (F'-13) 700 |
| | Radical generator t-BPOP | g | 0.9 | 0.9 | 0.9 | 0.9 | 0.9 | 0.9 |
| | Silane compound | | MPTES | MPTES | MPTES | MPTES | MPTES | MPTMS |
| | | g | 51 | 51 | 102 | 51 | 51 | 42 |
| | Functional group-modified conjugated diene polymer | | (F-8) | (F-9) | (F-10) | (F-11) | (F-12) | (F-13) |
| | Dilution solvent Cyclohexane | g | 1750 | 1750 | 1870 | 1750 | 1750 | 1730 |
| Step (3) | Solvent Cyclohexane | g | 1060 | 1350 | 990 | 700 | 700 | 700 |
| | Anionic initiator SBL | g | 55 | 35 | 110 | 78 | 61 | 78 |
| | Polar compound THF | g | 0 | 0 | 0 | 0 | 7.0 | 0 |
| | Monomer | | Bd | Bd | Bd | Bd | Bd/St = 50/50(wt) | Bd |
| | | g | 480 | 600 | 470 | 340 | 350 | 340 |
| | Active end polymer | | (I-8) | (I-9) | (I-10) | (I-11) | (I-12) | (I-13) |
| Step (4) | Lewis base THF | g | 9.9 | 12 | 9.8 | 7.0 | 0 | 7.0 |
| | Diluted solution of functional group-modified conjugated diene polymer | | (F-8) | (F-9) | (F-10) | (F-11) | (F-12) | (F-13) |
| | | g | 1060 | 660 | 1040 | 1480 | 1200 | 1480 |
| | Deactivation reagent SBL | g | 140 | 86 | 140 | 190 | 150 | 190 |
| | Terminator Methanol | g | 15 | 9.2 | 15 | 21 | 16 | 21 |
| Step (5) | Conjugated diene graft polymer | | (G-8) | (G-9) | (G-10) | (G-11) | (G-12) | (G-13) |

In Tables 1 and 2, abbreviations are as follows
SBL: sec-butyllithium
THF: tetrahydrofuran
t-BPOP: t-butyl peroxypivalate
Bd: 1,3-butadiene
Ip: isoprene
St: styrene
MPTES: (3-mercaptopropyl)triethoxysilane
MPTMS: (3-mercaptopropyl)trimethoxysilane

TABLE 3

| | | | | Example 1 | Example 2 | Example 3 |
|---|---|---|---|---|---|---|
| Coupling conditions | Conjugated diene graft polymer (G) | | | G-1 | G-2 | G-3 |
| | Functional group-modified conjugated diene polymer (F) | | | F-1 | F-2 | F-3 |
| | Functional group (c) | | | Ethoxysilyl group | Ethoxysilyl group | Ethoxysilyl group |
| | Active end polymer (I)/ Modified conjugated diene graft polymer (F) | | Molar ratio | 8 | 8 | 8 |
| Structure | Main chain | Formulation | | Bd | Bd | Bd |
| | | Weight average molecular weight (Mw) | | 26,000 | 26,000 | 26,000 |
| | | Vinyl content | mol % | 30 | 50 | 50 |
| | Side chain | Formulation | | Bd | Bd | Bd |
| | | Weight average molecular weight (Mw) | | 5,000 | 5,000 | 5,000 |
| | | Vinyl content | mol % | 10 | 10 | 50 |
| | Conjugated diene graft polymer (G) | Weight average molecular weight (Mw) | | 46,000 | 46,000 | 46,000 |
| | | Mw/Mn | | 1.5 | 1.5 | 1.5 |
| | | Styrene unit content | wt % | 0 | 0 | 0 |
| | | Rate of coupling | % | 95 | 95 | 95 |
| | | Hetero atom as branching point | | Si | Si | Si |
| | | Average number (Y) of branching points per molecule of polymer | | 4 | 4 | 4 |
| | | Average number (W) of side chains (b) per molecule of polymer | | 4 | 4 | 4 |
| | | Average number (W/Y) of side chains (b) per branching point | | 1 | 1 | 1 |
| | | Content of chlorine | ppm | 3 | 3 | 3 |
| Properties | | Transparency | | A | A | A |
| | Heat resistance | 100° C., 12 h | | A | A | A |
| | | 120° C., 12 h | | A | A | A |

| | Example 4 | Example 5 | Example 6 | Example 7 | Example 8 | Example 9 | Example 10 |
|---|---|---|---|---|---|---|---|
| | G-4 | G-5 | G-6 | G-7 | G-8 | G-9 | G-10 |
| | F-4 | F-5 | F-6 | F-7 | F-8 | F-9 | F-10 |
| | Ethoxysilyl group | Ethoxysilyl group | Ethoxysilyl group | Ethoxysilyl group | Ethoxysilyl group | Ethoxysilyl group | Ethoxysilyl group |
| | 8 | 8 | 8 | 8 | 8 | 8 | 16 |
| | Bd | Bd | Bd | Bd | Bd | Bd | Bd |
| | 26,000 | 26,000 | 26,000 | 78,000 | 26,000 | 26,000 | 26,000 |
| | 10 | 10 | 10 | 30 | 30 | 30 | 30 |

TABLE 3-continued

| | | | | | | |
|---|---|---|---|---|---|---|
| Bd | Bd | Bd | Bd | Bd | Bd | Bd |
| 5,000 | 5,000 | 5,000 | 5,000 | 10,000 | 20,000 | 5,000 |
| 50 | 30 | 10 | 10 | 10 | 10 | 10 |
| 46,000 | 46,000 | 46,000 | 98,000 | 66,000 | 106,000 | 66,000 |
| 1.5 | 1.5 | 1.5 | 1.5 | 1.5 | 1.5 | 1.5 |
| 0 | 0 | 0 | 0 | 0 | 0 | 0 |
| 95 | 95 | 95 | 95 | 95 | 95 | 93 |
| Si | Si | Si | Si | Si | Si | Si |
| 4 | 4 | 4 | 4 | 4 | 4 | 8 |
| 4 | 4 | 4 | 4 | 4 | 4 | 8 |
| 1 | 1 | 1 | 1 | 1 | 1 | 1 |
| 3 | 3 | 3 | 3 | 3 | 3 | 3 |
| A | A | A | A | A | A | A |
| A | A | A | A | A | A | A |
| A | A | A | A | A | A | A |

TABLE 4

| | | | | Example 11 | Example 12 | Example 13 |
|---|---|---|---|---|---|---|
| Coupling conditions | Conjugated diene graft polymer (G) | | | G-11 | G-12 | G-13 |
| | Functional group-modified conjugated diene polymer (F) | | | F-11 | F-12 | F-13 |
| | Functional group (c) | | | Ethoxysilyl group | Ethoxysilyl group | Methoxysilyl group |
| | Active end polymer (I)/ Modified conjugated diene graft polymer (F) | | Molar ratio | 8 | 8 | 4 |
| Structure | Main chain | Formulation | | Bd/Ip | Bd | Bd |
| | | Weight average molecular weight (Mw) | | 26,000 | 26,000 | 26,000 |
| | | Vinyl content | mol % | 30 | 50 | 30 |
| | Side chain | Formulation | | Bd | Bd/St | Bd |
| | | Weight average molecular weight (Mw) | | 5,000 | 5,000 | 5,000 |
| | | Vinyl content | mol % | 10 | 50 | 10 |
| | Conjugated diene graft polymer (G) | Weight average molecular weight (Mw) | | 46,000 | 46,000 | 46,000 |
| | | Mw/Mn | | 1.5 | 1.5 | 1.5 |
| | | Styrene unit content | wt % | 0 | 25 | 0 |
| | | Rate of coupling | % | 95 | 95 | 95 |
| | | Hetero atom as branching point | | Si | Si | Si |
| | | Average number (Y) of branching points per molecule of polymer | | 4 | 4 | 4 |
| | | Average number (W) of side chains (b) per molecule of polymer | | 4 | 4 | 4 |
| | | Average number (W/Y) of side chains (b) per branching point | | 1 | 1 | 1 |
| | | Content of chlorine | ppm | 3 | 3 | 3 |
| Properties | | Transparency | | A | A | A |
| | Heat resistance | 100° C., 12 h | | A | A | A |
| | | 120° C., 12 h | | A | A | A |

| Example 14 | Example 15 | Example 16 | Example 17 | Comparative Example 1 | Comparative Example 2 |
|---|---|---|---|---|---|
| G-14 | G-15 | G-16 | G-17 | G-18 | G-19 |
| F-14 | F-15 | F-16 | F-17 | F-18 | F-19 |
| Ethoxysilyl group | Borate ester group | Ethoxysilyl group | Ethoxysilyl group | Silyl chloride group | Silyl chloride group |
| 8 | 8 | 8 | 8 | 8 | 4 |
| Bd | Bd | Bd | Bd | Bd | Bd |
| 26,000 | 26,000 | 26,000 | 26,000 | 26,000 | 100,000 |
| 30 | 30 | 30 | 30 | 30 | 30 |
| Bd | Bd | Bd | Bd | Bd | Bd |
| 5,000 | 5,000 | 5,000 | 5,000 | 5,000 | 20,000 |
| 10 | 10 | 10 | 10 | 10 | 10 |
| 46,000 | 46,000 | 46,000 | 46,000 | 46,000 | 180,000 |
| 1.5 | 1.5 | 1.5 | 1.5 | 1.5 | 1.5 |
| 0 | 0 | 0 | 0 | 0 | 0 |
| 95 | 95 | 95 | 95 | 99 | 99 |
| Si | B | Si | Si | Si | Si |
| 4 | 4 | 4 | 4 | 4 | 4 |
| 4 | 4 | 4 | 4 | 4 | 4 |
| 1 | 1 | 1 | 1 | 1 | 1 |
| 3 | 3 | 50 | 500 | 7000 | 1500 |
| A | A | A | A | B | B |
| A | A | A | A | B | B |
| A | A | B | B | B | B |

It was found from Tables 3 and 4 that each of the conjugated diene graft polymers of Examples 1 to 17, in which the content of chlorine was not more than 1000 ppm, was excellent in transparency and heat resistance.

In this regard, it was found that each of the conjugated diene graft polymers of Comparative Examples 1 to 2, in which the content of chlorine was more than 1000 ppm, was inferior in transparency and heat resistance.

INDUSTRIAL APPLICABILITY

The conjugated diene graft polymer of the present invention has high transparency, heat resistance and weather resistance, and thus can be effectively used in a wide range of fields of interior and exterior components for automobiles, electric and electronic components, packaging materials, sports products, everyday sundries, lamination materials, stretching materials, various rubber products, medical products, various adhesives, various paint primers, and the like.

The invention claimed is:

1. A method for producing a conjugated diene graft polymer in which a side chain (b) comprising a polymer comprising at least one monomer unit selected from the group consisting of a conjugated diene unit and an aromatic vinyl compound unit is bonded to a main chain (a) comprising a polymer comprising a conjugated diene unit, via a hetero atom Z serving as a branching point and having a valence of not less than 3, the method comprising:

(A-1) reacting an active end polymer represented by the following formula (I):

wherein P represents a polymer chain including at least one monomer unit selected from the group consisting of a conjugated diene unit and an aromatic vinyl compound unit, and X represents an active end of anionic polymerization;
with a functional group-modified conjugated diene polymer having, as a branched chain, a moiety comprising a functional group represented by the following formula (II) to thereby produce a conjugated diene graft polymer,

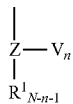 (II)

wherein V represents an alkoxy group or a hydroxyl group; Z is Si, Sn, Ge, Pb, P, B, or Al; $R^1$ represents a $C_{6-12}$ aryl group, a $C_{1-12}$ alkyl group, or a hydrogen atom; N represents the valence of Z; and n is an integer satisfying the following expression (1):

$$1 \leq n \leq N-1 \quad (1)$$

wherein V(s) may be the same or different when n is not less than 2; $R^1$(s) may be the same or different when N-n-1 is not less than 2; and Z(s) may be the same or different when a plurality of the branched chains relative to the main chain are comprised; and (B) recovering the conjugated diene graft polymer obtained.

2. The method of claim 1, further comprising:

(A-2) at least partially deactivating at least one remaining functional group selected from the group consisting of an alkoxy group and a hydroxyl group in the conjugated diene graft polymer; before the recovering (B).

3. The method of claim 1, wherein Z in the formula (II) is Si.

4. The method of claim 1, wherein V in the formula (II) is an alkoxy group.

5. The method of claim 1, wherein the average number of the side chains (b) bonded to one branching point is not less than 0.5.

6. A conjugated diene graft polymer composition, obtained by the method of claim 1, the conjugated diene graft polymer, comprising:

a main chain (a) comprising, in polymerized form, a conjugated diene unit; and a side chain (b) comprising a polymer comprising, in polymerized form, a conjugated diene unit and/or an aromatic vinyl compound unit;

wherein the side chain (b) is bonded to a main chain (a) via one hetero atom serving as a branching point and having a valence of not less than 3, wherein the main chain (a) is bonded to the branching point directly or through a linking chain, wherein the side chain (b) is directly bonded to the branching point, wherein the hetero atom of the branching point comprises Si, Sn, Ge, Pb, P, B, and/or Al, wherein a halogen content of a by-product in the composition, the byproduct comprising a lithium salt, is not more than 1000 ppm, and wherein an average number X of a functional groups (c) directly bonded to the branching point per molecule of the conjugated diene graft polymer is in a range of from 0 to 10.

7. The polymer of claim 6, wherein the by-product is lithium chloride.

8. A conjugated diene graft polymer composition, comprising:

a conjugated diene graft polymer, comprising: (a) a main chain comprising, in polymerized form, a conjugated diene unit; and (b) a side chain comprising, in polymerized form, a conjugated diene unit and/or an aromatic vinyl compound unit; and a lithium salt, wherein the side chain (b) of the conjugated diene graft polymer is bonded to the main chain (a) via one hetero atom serving as a branching point and having a valence of not less than 3, wherein the main chain (a) is bonded to the branching point directly or through a linking chain, wherein the side chain (b) is directly bonded to the branching point, wherein the hetero atom of the branching point comprises Si, Sn, Ge, Pb, P, B, and/or Al, wherein a halogen content of a by-product in the conjugated diene graft polymer composition, comprising the lithium salt, is not more than 1000 ppm, and wherein an average number X of a functional groups (c) directly bonded to the branching point per molecule of the conjugated diene graft polymer is in a range of from 0 to 10.

9. The polymer of claim 8, wherein the hetero atom as the branching point is Si.

10. The polymer of claim 8, wherein the average number of the side chains (b) directly bonded to one branching point is not less than 0.5.

11. A polymer composition, comprising:
the conjugated diene graft polymer of claim 6; and
an additional polymer other than the conjugated diene graft polymer.

12. A molded product, comprising, in molded form:
the conjugated diene graft polymer composition of claim 6.

13. The polymer of claim 8, wherein the by-product is lithium chloride.

14. The polymer of claim 8, wherein the halogen content of the by-product in the conjugated diene graft polymer composition is not more than 100 ppm.

15. A method for producing a conjugated diene graft polymer, the method comprising:
(A-1) reacting an active end polymer of formula (I):

P being a polymer chain comprising, in polymerized form, a conjugated diene unit and/or an aromatic vinyl compound unit, and X being an active end of anionic polymerization, with a functional group-modified conjugated diene polymer comprising, as a branched chain, a moiety comprising a functional group of formula (II):

V being independently a $C_{1-5}$ alkoxy group or a hydroxyl group, Z independently being Si, P, or Al, $R^1$ independently being a $C_{6-12}$ aryl group, a $C_{1-12}$ alkyl group, or a hydrogen atom, N being a valence of Z, and n being an integer satisfying expression (1):

$$1 \leq n \leq N-1 \qquad (1),$$

to thereby produce a conjugated diene graft polymer comprising a side chain (b) comprising a polymer comprising, in polymerized form, the conjugated diene unit and/or the aromatic vinyl compound unit, bonded to the main chain (a) via Z, a hetero atom serving as a branching point, the valence of Z being not less than 3 and identical to n, the main chain (a) comprising, in polymerized form, the conjugated diene unit; and
(B) recovering the conjugated diene graft polymer obtained.

16. The method of claim 15, further comprising:
(A-2) at least partially deactivating at least one remaining functional group selected from the group consisting of an alkoxy group and a hydroxyl group in the conjugated diene graft polymer; before the recovering (B).

17. The method of claim 15, wherein Z in the formula (II) is Si.

18. The method of claim 15, wherein V in the formula (II) is an alkoxy group.

19. The method of claim 15, wherein the average number of the side chains (b) bonded to one branching point is not less than 0.5.

20. The method of claim 15, wherein
Z in the formula (II) is Si, and
V in the formula (II) is an alkoxy group, and
wherein the average number of the side chains (b) bonded to one branching point is not less than 0.5.

* * * * *